(12) United States Patent
Kiziah

(10) Patent No.: US 10,894,691 B2
(45) Date of Patent: Jan. 19, 2021

(54) APPARATUS FOR DISPENSING OR INSTALLING A CABLE

(71) Applicant: Automated Systems Design, Inc., Alpharetta, GA (US)

(72) Inventor: Kevin R. Kiziah, Newton, AZ (US)

(73) Assignee: Automated Systems Design, Inc., Alpharetta, GA (US)

( * ) Notice: Subject to any disclaimer, the term of this patent is extended or adjusted under 35 U.S.C. 154(b) by 51 days.

(21) Appl. No.: 16/272,152

(22) Filed: Feb. 11, 2019

(65) Prior Publication Data

US 2019/0248617 A1  Aug. 15, 2019

Related U.S. Application Data

(63) Continuation of application No. PCT/US2019/017403, filed on Feb. 10, 2019.
(Continued)

(51) Int. Cl.
*B65H 49/32* (2006.01)
*B65H 59/04* (2006.01)
*H02G 1/00* (2006.01)

(52) U.S. Cl.
CPC ......... *B65H 49/322* (2013.01); *B65H 49/327* (2013.01); *B65H 59/04* (2013.01);
(Continued)

(58) Field of Classification Search
CPC .... B65H 49/322; B65H 49/327; B65H 59/04; H02G 1/00
See application file for complete search history.

(56) References Cited

U.S. PATENT DOCUMENTS 5,642,812 A * 7/1997 Hale ................ B65D 5/5004
                                              206/303
9,371,171 B1   6/2016 Babcock
(Continued)

FOREIGN PATENT DOCUMENTS

EP     1700808      9/2006
JP     2007-055626  3/2007

OTHER PUBLICATIONS

ISR, PCT/US19/17403, filed Feb. 10, 2019, ASD, Kiziah, Kevin R (Corresponds to Current App).
(Continued)

*Primary Examiner* — William E Dondero
(74) *Attorney, Agent, or Firm* — Allan Watts

(57) ABSTRACT

An apparatus for installing cable that includes an outer box. Some embodiments include a reel, the cable, multiple components for installing the cable, and an inner packaging component that holds the components. Some embodiments include tie holes (e.g., two that line up) for passage of a zip tie for attachment of the apparatus to an identical box or anchoring object when pulling the cable. Boxes may include a left side with side flaps connected to front and back sides and cable holes in each flap line up when the box is assembled for passage of cable from the apparatus. The reel may be loose inside the box, which acts as a brake to keep the reel from over spinning when (e.g., communications) cable is pulled. Some outer boxes include certain sides, bends, flaps, tabs, or slots. The inner packaging component may be held in position by an elongated member.

13 Claims, 17 Drawing Sheets

Related U.S. Application Data

(60) Provisional application No. 62/629,270, filed on Feb. 12, 2018.

(52) U.S. Cl.
CPC ...... *B65H 2402/40* (2013.01); *B65H 2701/34* (2013.01); *H02G 1/00* (2013.01)

(56) References Cited

U.S. PATENT DOCUMENTS

| | | |
|---|---|---|
| 2003/0230667 A1 | 12/2003 | Ganster |
| 2004/0031877 A1* | 2/2004 | Smith, Jr. .............. B65H 59/04 242/588.4 |
| 2015/0115095 A1 | 4/2015 | Crossett et al. |

OTHER PUBLICATIONS

Written Opinion, PCT/US19/17403, filed Feb. 10, 2019, ASD, Kiziah, Kevin R (Corresponds to Current App).

* cited by examiner

APPARATUS FOR DISPENSING OR INSTALLING A CABLE

RELATED PATENT APPLICATIONS

This patent application is a non-provisional patent application of, and claims priority to, U.S. provisional patent application No. 62/629,270, filed Feb. 12, 2018, APPARATUS FOR DISPENSING OR INSTALLING A CABLE, having the same inventor and assignee. This patent application is also a continuation patent application of, and claims priority to, international patent application number PCT/US19/17403, filed in the United States Patent and Trademark Office on Feb. 10, 2019 under the Patent Cooperation Treaty (PCT), having the same title, inventor, and assignee. The priority PCT patent application also claims priority to the above provisional patent application. The contents of the priority provisional patent application and the priority PCT patent application are each incorporated herein by reference. If there are any conflicts or inconsistencies between this patent application and the incorporated documents, however, this patent application governs herein.

FIELD OF THE INVENTION

Various embodiments of this invention relate to devices for dispensing or installing a cable, for example, a communications cable, for instance, for a computer, printer, phone, or other electronic device. Other embodiments include methods of construction and use of such a device. Specific embodiments are or include packaging (e.g., an outer box), various components within the packaging (e.g., the cable), or both.

BACKGROUND OF THE INVENTION

Cable, including electrical cable, has been used to connect various electronic devices, including for power and communications. Such electronic devices have included, as examples, computers, printers, phones, audio equipment, (e.g., video) cameras, and servers. Such cable has included communications cable, for example, with multiple strands. Cable and various components used for installing cable have been packaged in various types of packaging including separately in boxes (e.g., a category cable box), but a combination of cable and the components used for installing the cable have typically not been packaged and distributed together, for example, in a single outer box. As a result, people have had to shop for and purchase separately cable and components used for the installation of cable. It has often been necessary to purchase cable or components in bulk rather than just what is needed for a single installation or drop.

Various components have been used for installing (e.g., communications) cable, but the multiple components for installing the cable have not been located within a box that contains the cable. Further, various inner packaging component have been used for packaging various components, including an inner box within an outer box, and including inner packaging components that hold multiple components, but multiple components used for installing a (e.g., communications) cable have typically not been packaged in this manner, especially not in combination with the cable.

Further still, cable has been distributed on a reel, for example, wound around the reel, but such reels have typically been mounted on a spindle when the cable is pulled for installation. Problems have existed during installation of such cable where the reel has continued to rotate when a length of cable has been pulled, and the continued rotation of the reel has resulted in the cable coming off the reel and becoming tangled, stuck, or even damaged. This has required additional time, manpower, or skill to dispense cable, which has increased the cost of installation.

Even further, boxes have been used that include a front side, a back side opposite the front side, a right side extending from the front side to the back side, a left side opposite the right side and extending from the front side to the back side, a bottom side extending from the front side to the back side and extending from the right side to the left side, and a top side opposite the bottom side, for example, extending from the front side to the back side, and extending from the right side to the left side. Such boxes, however, have typically not contained a reel located inside the box, the cable (e.g., wound around the reel), multiple components used for installing the cable, an inner packaging component (e.g., holding the multiple components used for installing the communications cable), or a combination thereof. Even further still, such boxes have typically not included specific features for containing or accessing the contents of the box such as specific flaps, slots, tabs, holes, etc., for instance, specifically configured for dispensing cable or securing the apparatus, particular components used therewith, or a combination thereof.

Needs and opportunities for improvement exist for partially or fully overcoming one or more of these or other deficiencies in the prior art in the areas of dispensing, installing, or packaging cable, components used for installing the cable, or both. Room for improvement exists over the prior art in these and various other areas that may be apparent to a person of ordinary skill in the art having studied this document.

SUMMARY OF PARTICULAR EMBODIMENTS OF THE INVENTION

This invention provides, among other things, various apparatuses for dispensing or installing a cable, for example, communications cable, for instance, for a computer, printer, phone, or other electronic device. Other embodiments include methods of construction and use of such an apparatus. Specific embodiments are or include packaging (e.g., an outer box), various components within the packaging (e.g., the cable), or both. Certain embodiments provide, for example, as objects or benefits, for instance, that they improve the dispensing, installing, or packaging of cable (e.g., communications cable), components used for installing the cable, or both. Different embodiments simplify the installation of cable, reduce the installed cost of the technology, increase resource utilization efficiency, or a combination thereof, as examples.

Specific embodiments are or include, for example, an apparatus for installing a cable that includes an outer box, a reel (e.g., located inside the outer box), the cable (e.g., wound around the reel), multiple components used for installing the cable (e.g., the multiple components being located within the outer box), and an inner packaging component (e.g., within the outer box), for example, where the inner packaging component holds the multiple components used for installing the cable. In some embodiments, for example, the outer box includes a first cable hole, for instance, for passage of the cable from the apparatus. Further, in some embodiments, the reel is loose inside the outer box, for example, which acts as a brake to keep the reel from over spinning, for instance, when the cable is pulled from the reel. Still further, in particular embodiments, the outer box includes a first tie hole, a second tie hole, or both, for example, that are sized and configured for passage of a zip tie, for instance, for attachment of the outer box to an identical outer box or anchoring object, as examples. Even further, in certain embodiments, the first tie hole is in line with the second tie hole when the outer box is assembled. Further still, in various embodiments, the cable is a communications cable.

In a number of embodiments (i.e., when the outer box is assembled), the outer box includes a front side, a back side opposite the front side, a right side extending from, the front side to the back side, a left side opposite the right side and extending from the front side to the back side, a bottom side extending from the front side to the back side and extending from the right side to the left side, and a top side opposite the bottom side, extending from the front side to the back side, and extending from the right side to the left side. Further, in some embodiments, the outer box includes a first cable hole, for example, in the left side, for instance, for passage of the cable from the apparatus. Further still, in particular embodiments, the outer box includes a first bend, for example, between the front side and the right side, a second bend, for instance, between the back side and the right side, or both such bends. Even further, in certain embodiments, the left side includes a first side flap, for example, connected to the back side, a second side flap, for instance, connected to the front side, or both such flaps. Still further, in particular embodiments, the left side includes a first side slot, and a first side tab, for instance, that fits into the first side slot when the outer box is assembled. Still further, in certain embodiments, the left side includes a first cable hole, for example, through the first side flap, a second cable hole, for instance, through the second side flap, or both such cable holes. Even further still, in some embodiments (i.e., when the outer box is assembled), the first cable hole lines up with the second cable hole, for example, for passage of the cable from the apparatus.

Moreover, in some embodiments, the outer box further includes a first tie hole (e.g., in the front side), and a second tie hole (e.g., in the back side), for example, that are sized and configured for passage of a zip tie, for instance, for attachment of the outer box, for example, to an identical outer box or anchoring object. Further, in some embodiments, the multiple components used for installing the cable are accessed, for example, by opening the top side of the outer box. Still further, in certain embodiments, the inner packaging component extends (e.g., within the outer box), for example, from the front side to the back side, from the left side to the right side, or both. Even further, in particular embodiments, the inner packaging component is held in position (e.g., within the outer box) by the reel, by an elongated member (e.g., of the inner packaging component), for instance, that extends (e.g., within the outer box) to the bottom side, or by both a reel and an elongated member.

Further specific embodiments are or include an apparatus for dispensing a cable that includes an outer box that includes a first tie hole and a second tie hole, for example, where the first tie hole and the second tie hole are sized and configured for passage of a zip tie, for instance, for attachment of the apparatus to an identical apparatus or anchoring object, as examples. Still further, in some such embodiments, the outer box includes (i.e., when assembled) a front side, a back side opposite the front side, a right side extending from the front side to the back side, a left side opposite the right side and extending from the front side to the back side, a bottom side extending from the front side to the back side and extending from the right side to the left side, a top side opposite the bottom side, extending from the front side to the back side, and extending from the right side to the left side, or a combination thereof, as examples. Even further, in particular embodiments, the first tie hole is in the front side, the second tie hole is in the back side, or both. Further still, some such embodiments include a first cable hole, for example, in the left side, for instance, for passage of the cable from the apparatus. Even further still, in particular embodiments, the second tie hole is in line with the first tie hole (i.e., when the box is assembled).

Various embodiments are or include an apparatus for dispensing a cable that includes an outer box that includes a front side, a back side opposite the front side, a right side extending from the front side to the back side, a left side opposite the right side and extending from the front side to the back side, a bottom side extending from the front side to the back side and extending from the right side to the left side, and a top side opposite the bottom side, extending from the front side to the back side, and extending from the right side to the left side. In some specific embodiments, for example, the left side includes a first side flap, for instance, connected to the back side, and a second side flap, for example, connected to the front side. Further, in some embodiments, the left side includes a first cable hole, for example, through the first side flap, and a second cable hole, for instance, through the second side flap, and, for instance, (i.e., when the outer box is assembled), the first cable hole lines up with the second cable hole, for example, for passage of the cable from the apparatus. In addition, various other embodiments of the invention are also described herein, and other benefits of certain embodiments may be apparent to a person of ordinary skill in the art having studied this document.

BRIEF DESCRIPTION OF THE DRAWINGS

The drawings provided herewith illustrate, among other things, examples of certain aspects of particular embodiments. Various embodiments may include aspects shown in the drawings, described in the specification (including the claims), known in the art, or a combination thereof, as examples. Other embodiments, however, may differ. Reference numbers are used on the drawings to identify various components and parts of components of certain examples of embodiments that are described herein. One reference number may be used on different views to identify the same component or part. The first digit or two digits of a reference number may indicate a figure number in which that component or part is identified.

DETAILED DESCRIPTION OF EXAMPLES OF EMBODIMENTS

This patent application describes, among other things, examples of certain embodiments, and certain aspects thereof. Other embodiments may differ from the particular examples described in detail herein. Various embodiments are or include, for example, an apparatus, for instance, for installing a cable or for dispensing a cable. In many embodiments, the cable is category cable, communications cable, data cable, computer cable, or telephone cable, as examples, or a combination thereof. In various embodiments, as examples, the cable is iCAT-ITS cable, Cat6 cable, Cat5e cable, plenum cable, riser cable, or a combination thereof. In some embodiments, for instance, the cable is 100 feet to 300 feet long. Other embodiments provide other lengths of cable. Further, in particular embodiments, different lengths of the cable are provided in (e.g., identical) outer boxes. In particular embodiments, for example, each outer box contains a reel of iCAT-ITS cable, either Cat6 or Cat5e, Plenum or Riser. In particular embodiments, each outer box is provided with different lengths of cable from 100 feet up to 300 feet.

Further, in various embodiments, the apparatus (e.g., 100 shown in FIGS. 1 to 13) is or includes an outer box (e.g., 101 shown in FIGS. 1 to 15). In some embodiments, for example, the apparatus (e.g., 100, for instance, for installing a cable, for instance, communications cable) includes an outer box (e.g., 101) and includes a reel (e.g., 707 shown in FIGS. 7 to 11), for instance, located inside the outer box (e.g., 101). Still further, in a number of embodiments, the apparatus (e.g., 100) includes the cable (e.g., 102 shown in FIGS. 1 to 13), for example, wound around the reel (e.g., 707). Further still, some such embodiments include multiple components (e.g., 404 shown in FIGS. 4, 7 to 11, 17, and 18, including components 1820 to 1825) used for installing the cable (e.g., 102). In some such embodiments, for example, the multiple components (e.g., 404) for installing the communications cable (e.g., 102) are located within the outer box (e.g., 101). Even further, some embodiments include a tray or an inner packaging component (e.g., 710 shown in FIGS. 4, 7 to 11, and 16 to 18), for example, within the outer box (e.g., 101, for instance, as shown in FIGS. 4 and 7 to 11). Even further still, in some such embodiments, the inner packaging component (e.g., 710) holds the multiple components (e.g., 404) used for installing the cable (e.g., 102), for instance, as shown.

Figure 12:
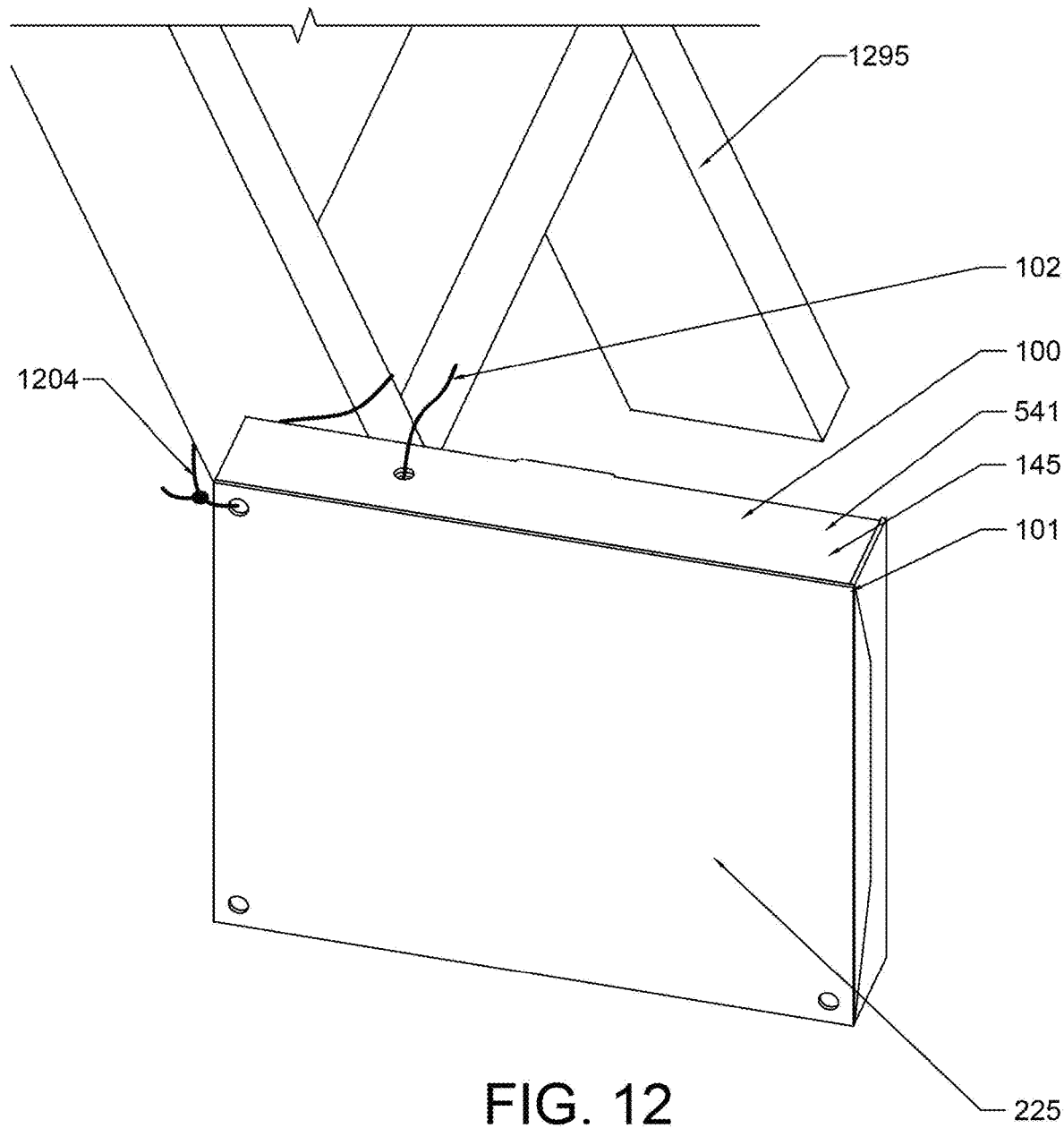
FIG. 12 is another isometric view of the apparatus or outer box of FIGS. 1 to 11. In this downward-looking view, the back side of the outer box is visible facing down and the top side of the box is not visible on the left side. The bottom side of the box is visible on the right side. The right side of the box is not visible and is sitting on the floor, the left side of the box is visible and is facing up for pulling the cable, and the outer box is attached with a zip tie to a step ladder (an example of an anchoring object) to stabilize the box while the cable is pulled from the outer box. In this view, the outer box is assembled (i.e., closed).
Figure 13:
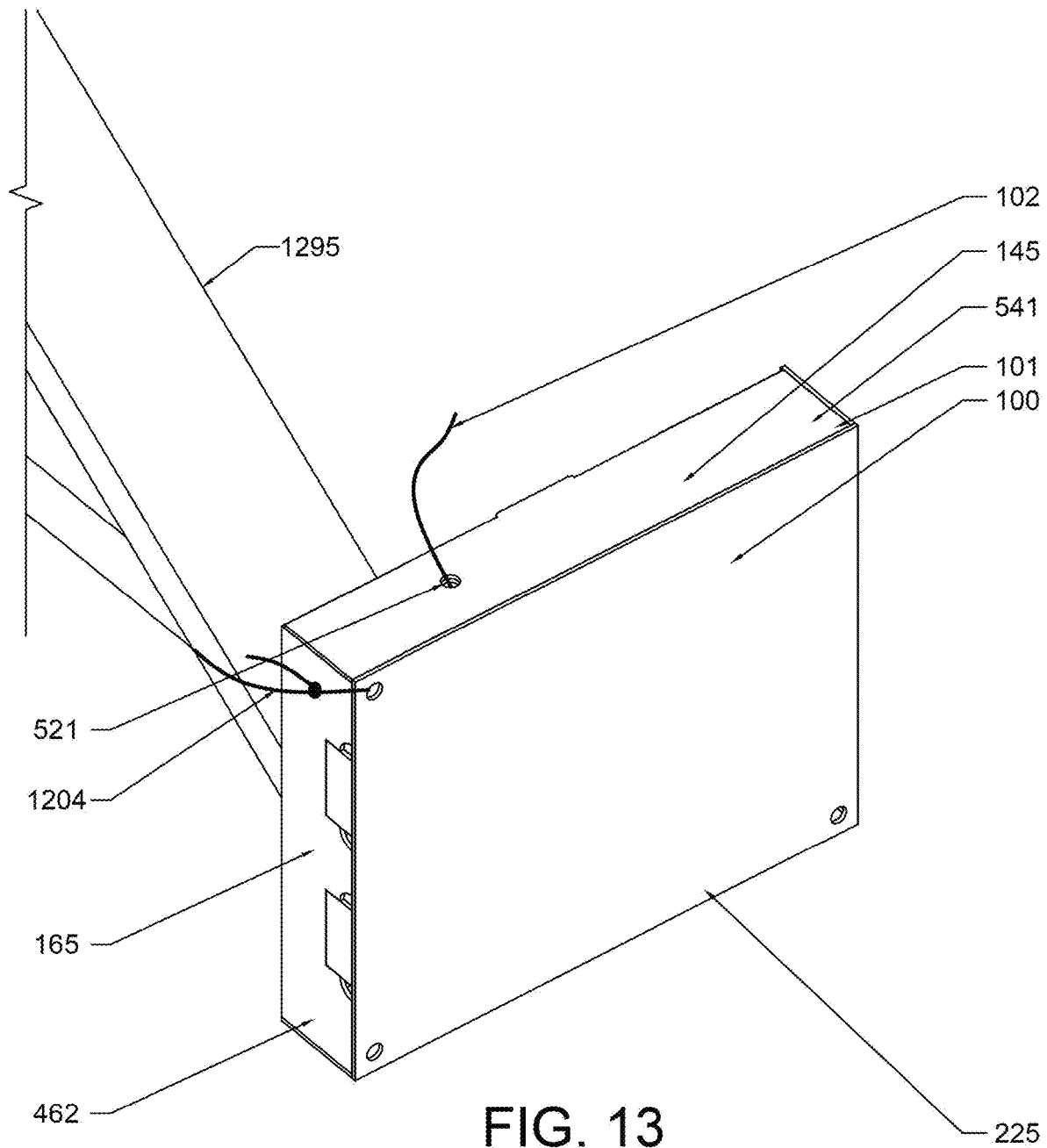
FIG. 13 is another isometric view of the apparatus or outer box of FIGS. 1 to 12 sitting on the floor with the left side of the box facing up for pulling the cable and attached with a zip tie to a ladder to stabilize the box while the cable, is pulled. In this view, the back side of the outer box is facing down and to the right, the top side of the box is facing down and to the left, and the left side of the outer box is facing up.
Figure 14:
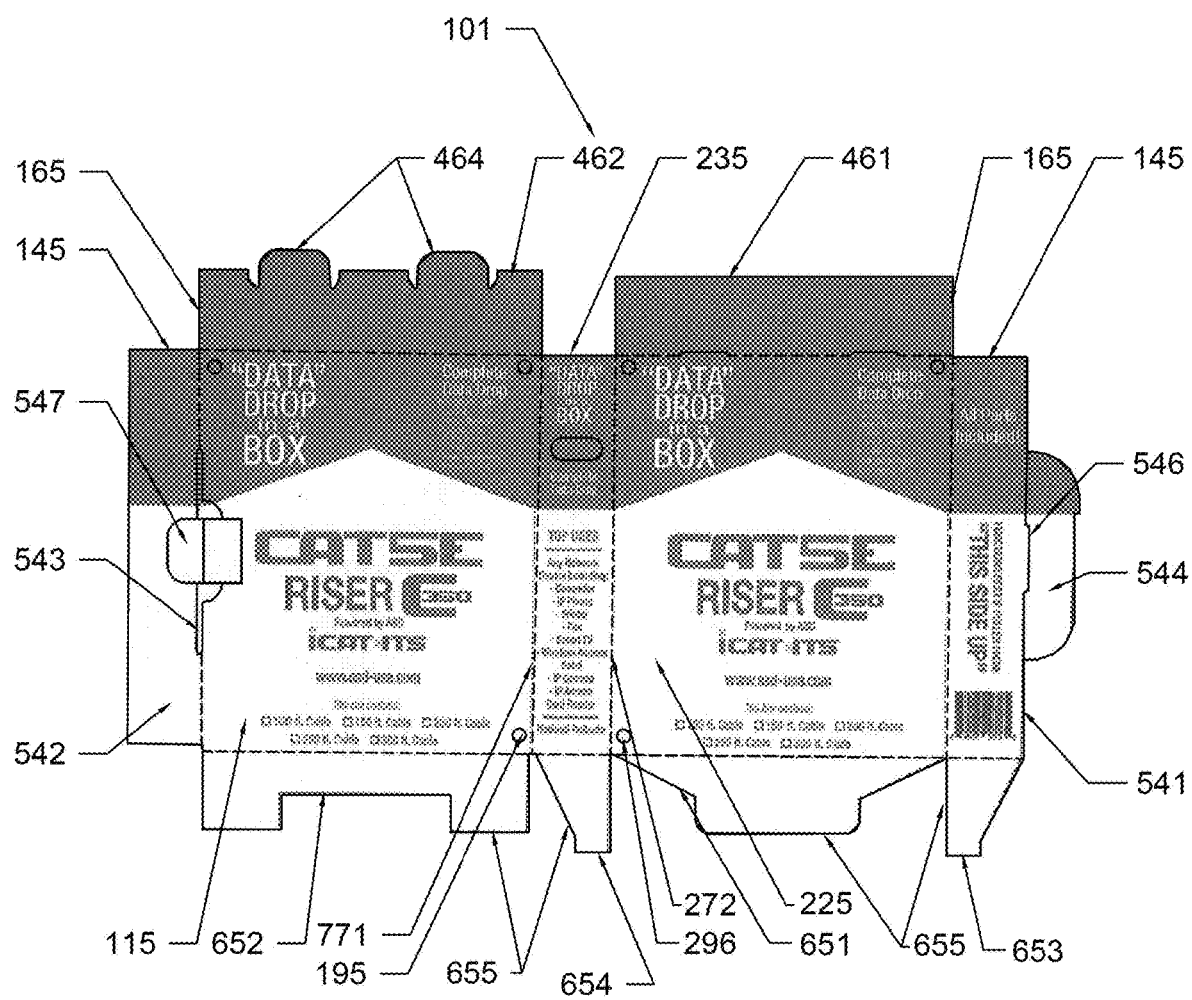
FIG. 14 is a flat pattern of an example of an outer box. The right side of the outer box is near the center of the view, the front side of the outer box is left of center of the view, and the back side of the outer box is right of the center of the view. The two flaps that form the left side of the outer box are on the far left side and far right side of the view. This view also shows an example of a printing, pattern that is printed on the outer box, for example, in blue.
Figure 15:
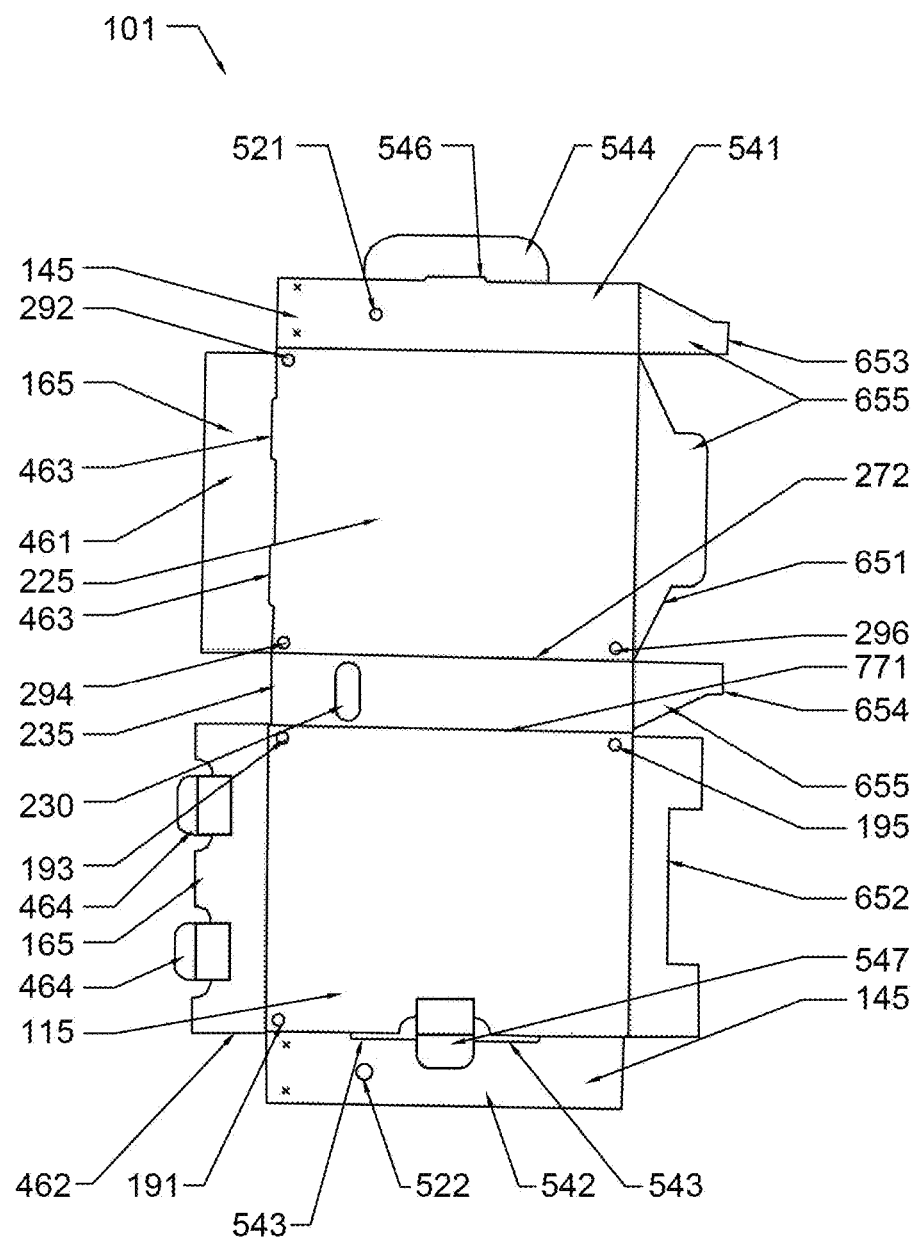
FIG. 15 is another flat pattern of an outer box. The top side of the outer box is on the left side of the view and the bottom side of the outer box is on the right side of the view. Many interior lines are partial cuts, in some embodiments, to facilitate bending when the box is assembled or folded.

In particular embodiments, the apparatus (e.g., 100) or outer box (e.g., 101) includes a front side (e.g., 115 shown in FIGS. 1, 3, 5 to 10, 14, and 15) and a back side (e.g., 225 shown in FIGS. 2, 7, 8, and 10 to 15). In a number of embodiments, for example, the back side (e.g., 225) is opposite the front side (e.g., 115), for instance, as shown (i.e., when the box is assembled). Further, various embodiments include a right side (e.g., 235 shown in FIGS. 2, 4, 11, 14, and 15). In a number of embodiments, for example, the right side (e.g., 235) extends (i.e., when the box is assembled) from the front side (e.g., 115) to the back side (e.g., 225), for instance, as shown in FIGS. 14 and 15. Still further, various embodiments include a left side (e.g., 145 shown in FIGS. 1, 3 to 5, 7 to 9, and 11 to 15). Even further, in a number of embodiments, the left side (e.g., 145) is (i.e., when the box is assembled) opposite the right side (e.g., 235), extends from the front side (e.g., 115) to the back side (e.g., 225), or both. Further still, various embodiments include a bottom side (e.g., 655 shown in FIGS. 6 to 9, 11, 14, and 15), for example, extending (i.e., when the box is assembled) from the front side (e.g., 115) to the back side (e.g., 225), extending from the right side (e.g., 235) to the left side (e.g., 145), or both. Even further still, various embodiments include a top side (e.g., 165 shown in FIGS. 1 to 11 and 13 to 15), for example, (i.e., when the box is assembled) opposite the bottom side (e.g., 655), extending, from the front side (e.g., 115) to the back side (e.g., 225), extending from the right side (e.g., 235) to the left side (e.g., 145), or a combination thereof.

Further, in some embodiments, the outer box (e.g., 101) further includes a (e.g., first) cable hole (e.g. 521 shown in FIGS. 3, 5, 7 to 9, 13, and 15), for example, in the left side (e.g., 145) of the outer box (e.g., 101), for instance, for passage of the cable (e.g., 102) from the apparatus (e.g., 100) or box (e.g., 101). See also FIGS. 1, 4, and 12. In various embodiments, the outer box (e.g., 101) includes a first cable hole (e.g. 521) for passage of the cable (e.g., 102) from the apparatus (e.g., 100), and the left side (e.g., 145) of the outer box (e.g., 101) is an example of where such a cable hole (e.g., 521) may be located.

Various embodiments of an outer box (e.g., 101) include a first bend (e.g. 771 shown in FIGS. 2, 3, 5 to 7, 14, and 15), for example, between the front side (e.g., 115) and the right side (e.g., 235). Further, various embodiments include a second bend (e.g. 272 shown in FIGS. 2, 14, and 15), for instance, between the back side (e.g., 225) and the right side (e.g., 235). Further still, in a number of embodiments, the top side (e.g., 165) includes a first top flap (e.g. 461 shown in FIGS. 4, 5, 7, 10, 11, 14, and 15), for example, connected to the back side (e.g., 225). Still further, some embodiments include a second top flap (e.g. 462 shown in FIGS. 1 to 10 and 13 to 15), for instance, connected to the front side (e.g., 115), at least one top slot (e.g. 463 shown in FIGS. 4 and 15), for example, between the first top flap (e.g. 461) and the back side (e.g., 225), for example, within a bend or fold between the first top flap (e.g. 461) and the back side (e.g., 225). Two top slots (e.g., first and second top slots 463) are shown, for instance, in FIGS. 4 and 15. Various flaps and tabs described herein may be connected to adjacent sides or flaps, for example, with bends or folds, for instance, in the material (e.g., cardboard) of the (e.g., outer) box. See, for example, FIGS. 14 and 15. Various bends are formed, in a number of embodiments, when the outer box (e.g., 101) is folded for assembly of the box, for example. Further bends that are apparent from the drawings, in the embodiment shown, may be similar to bends described in more detail herein.

Further, some embodiments include at least one top tab (e.g. 464 shown in FIGS. 3 to 10, 14, and 15), for example, that is (or are) connected (e.g., by a bend) to the second top flap (e.g. 462). In some embodiments, the at least one top tab (e.g. 464), fit(s) into the at least one top slot (e.g. 463), or both, for instance, when the outer box (e.g., 101) is assembled. Two top tabs (e.g., first and second top tabs 464) are shown, for instance, in FIGS. 4, 5, 7 to 9, 14, and 15. Various tabs described herein, shown in the drawings, or both, fit into various slots and may fit with a tight fit or interference fit, for example, so that a certain about of force must be used to remove the tab from the slot. This can prevent the box from opening when not intended.

Further still, in some embodiments, the left side (e.g., 145) of the outer box (e.g., 101) includes a first side flap (e.g., 541 shown in FIGS. 1, 3 to 5, and 7 to 15) connected (e.g., by a bend formed when the box is folded) to the back side (e.g., 225). Even further, in some embodiments, the left side (e.g., 145) includes a second side flap (e.g., 542 shown in FIGS. 5, 7 to 9, 14, and 15) connected (e.g., by a bend formed when the box is folded) to the front side (e.g., 115). An example is shown. Still further, various embodiments include, or the left side (e.g., 145) includes, a first side slot (e.g., 543 shown in FIGS. 1, 3, 5, 9, 14, and 15) and a first side tab (e.g., 544 shown in FIGS. 1, 3, 5 to 9, 14, and 15) that fits into the first side slot (e.g., 543) when the outer box (e.g., 101) is assembled. Further still, various embodiments include, or the left side (e.g., 145) includes, a second side slot (e.g., 546 shown in FIGS. 1, 3, 5, 7 to 9, 14, and 15) and a second side tab (e.g., 547 shown in FIGS. 5 to 9, 14, and 15) that fits into the second side slot (e.g., 546) when the outer box (e.g., 101) is assembled. In some embodiments, for example, the first side tab (e.g., 544) is connected (e.g., by a bend) to the first side flap (e.g., 541), the first side slot (e.g., 543) is between the front side (e.g., 115) and the second side flap (e.g., 542), or both. Further, in particular embodiments, the second side tab (e.g., 547) is connected (e.g., by a bend) to the front side (e.g., 115), the second side slot (e.g., 546) is between the first side flap (e.g., 541) and the first side tab (e.g., 544), or both.

Even further, in some embodiments the outer box (e.g., 101), for example, the left side (e.g., 145) includes a first cable hole (e.g. 521), for example, through the first side flap (e.g., 541), a second cable hole (e.g. 522 shown in FIGS. 5, 7, 9, 11, and 15), for example, through the second side flap (e.g., 542), or both (e.g., as shown). In particular embodiments, for example, when the outer box (e.g., 101) is assembled, for example, with the first side tab (e.g., 544) inserted fully into the first side slot (e.g., 543), the first cable hole (e.g. 521) lines up with the second cable hole (e.g. 522), for instance, for passage of the cable (e.g., 102), for example, from the apparatus (e.g., 100) or box (e.g., 101). In this context, as used herein, "lines up with" means that at least part of the two holes (e.g., 521 and 522) line up or overlap sufficiently to allow passage of the cable (e.g., 102) through the two holes (e.g., 521 and 522) when the box (e.g., 101) is assembled. In a number of embodiments, the first cable hole (e.g. 521), the second cable hole (e.g. 522) or both, is (or are) round (e.g., as shown).

In some embodiments, an apparatus (e.g., 100) for dispensing a cable (e.g., 102) is or includes an outer box (e.g., 101) that includes a first tie hole (e.g. 191 shown in FIGS. 1, 3, 5, 7 to 9, and 15), for example, in the front side (e.g., 115). Further, in some embodiments, an apparatus (e.g., 100) for dispensing a cable (e.g., 102) is or includes an outer box (e.g., 101) that includes a second tie hole (e.g. 292 shown in FIGS. 2, 7, 8, 10, and 15), for instance, in the back side (e.g., 225). In certain embodiments, for example, the second tie hole (e.g., 292), for instance, in the back side (e.g., 225) is in line with the first tie hole (e.g. 191), for example, in the front side (e.g., 115). In various embodiments, the first tie hole (e.g. 191) is in line with the second tie hole (e.g. 292) when the outer box (e.g., 101) is assembled. Further, in various embodiments, the first tie hole (e.g. 191), the second tie hole (e.g. 292), or both, are round (e.g., as shown). Moreover, in some embodiments, other tie holes are in line with each other (e.g., as shown or described herein). In other embodiments, however, tie holes, cable holes, or other holes, may have a different shape, such as oval, half round, elongated, rectangular, square, polygonal, trapezoidal, triangular, pentagonal, hexagonal, or octagonal, as examples.

Further, in various embodiments, the first tie hole (e.g. 191) and the second tie hole (e.g. 292) are sized and configured for passage of a zip tie (e.g., 1104 shown in FIGS. 4 and 7 to 11 or 1204 shown in FIGS. 12 and 13) for attachment of the apparatus (e.g., 100) to an identical (i.e., within manufacturing tolerances) apparatus (e.g., 100) or anchoring object (e.g., step ladder 1295 shown in FIGS. 12 and 13). As used herein, "in line" means to within a 30-degree angle from the front side (e.g., 115) to the back side (e.g., 225) when the box is assembled (e.g., with all tabs in their corresponding slots). Some such embodiments further include a (e.g., first) cable hole (e.g. 521), for example, in the left side (e.g., 145), for instance, for passage of the cable (e.g., 102) from the apparatus (e.g., 100).

Figure 1:
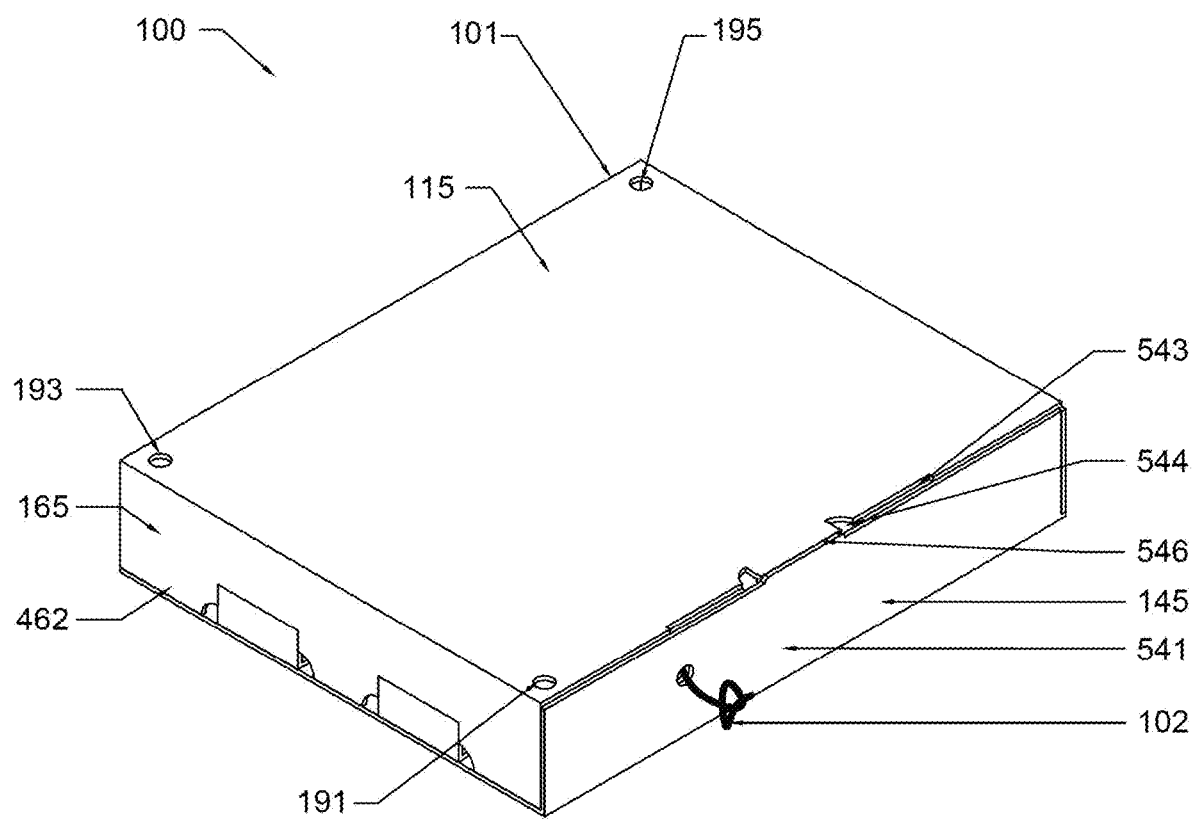
FIG. 1 is an isometric view of an example of an apparatus for installing or dispensing a (e.g., communications) cable. Illustrated is an assembled outer box and part of the cable, which is extending from a cable hole in the left side of the outer box and is tied in a knot to keep the cable end from slipping into the outer box. In this view, the front side of the box is up, the left side of the box faces to the right, and the top side of the box faces to the left.

Further, in some embodiments, the outer box (e.g., 101) includes multiple pairs of tie holes, for example, that are sized and configured for passage of a zip tie (e.g., 1104 or 1204), for instance, for attachment of the outer box (e.g., 101) to an identical outer box (e.g., 101) or anchoring object (e.g., ladder 1295). In certain embodiments, for instance, the outer box (e.g., 101) includes three pairs of tie holes that are sized and configured for passage of a zip tie (e.g., 1104 or 1204) for attachment of the outer box (e.g., 101) to an identical outer box (e.g., 101) or anchoring object (e.g., 1295). FIG. 1, for example, shows tie holes 191, 193, and 195, which are in line with tie holes 292, 294, and 296, respectively, shown, for instance, in FIG. 2. See also FIGS. 3 and 5, to 15). In a number of embodiments, the tie holes are in the front side (e.g., 115) and the back side (e.g., 225) of the outer box (e.g., 101), for instance, as shown.

Still further, in some embodiments, the front side (e.g., 115) has multiple front corners, the back side (e.g., 225) has multiple back corners, and the tie holes are located in at least one of the front corners and at least one of the back corners (e.g., as shown). As used herein, a tie hole is considered to be "in" a first corner if the tie hole is at least five times as far from an opposite corner on the same side (e.g., of the box) as the tie hole is from the first corner. Even further, in particular embodiments, the front side (e.g., 115) has multiple front corners (e.g., 4), the back side (e.g., 225) has multiple back corners (e.g., 4), and tie holes are in multiple of the front corners and multiple of the back corners. An example is shown. Further still, in certain embodiments, the front side (e.g., 115) has four front corners, the back side (e.g., 225) has four back corners, and tie holes are in at least three of the front corners and at least three of the back corners (e.g., as shown). In various embodiments, for each tie hole (e.g., 191, 193, and 195) in the front side (e.g., 115), there is a corresponding tie hole (e.g., 292, 294, and 296) in the back side (e.g., 225) that is in line with the tie hole in the front side (e.g., 115). Similarly, in various embodiments, for each tie hole (e.g., 292, 294, and 296) in the back side (e.g., 225), there is a corresponding tie hole (e.g., 191, 193, and 195) in the front side (e.g., 115) that is in line with the tie hole in the back side (e.g., 225). Even further still, in some embodiments, the outer box (e.g., 101) includes tie holes (e.g., 191, 193, 195, 292, 294, and 296) that are sized and configured for passage of a zip tie (e.g., 1104 or 1204) for attachment of the outer box (e.g., 101) to an identical outer box (e.g., 101) or anchoring object (e.g., ladder 1295), for example, to keep the outer box (e.g., 101) from tipping over or lifting during a pulling process. In some embodiments, for instance, there are (e.g., tie) holes (e.g., 191, 193, 195, 292, 294, and 296) designed or formed (e.g., cut) in the box in three positions or locations (e.g., as shown). Further, in some embodiments, two sets (e.g., 193 and 294, and 195 and 296) of tie holes are on the right side (e.g., 235) of the box, two sets of tie holes (e.g., 191 and 292, and 193 and 294) are on the top side (e.g., 165) of the box, or both. In a number of embodiments, an installer can use zip ties (e.g., 1104 or 1204) through these tie holes (e.g., one or more pairs of 191, 193, 195, 292, 294, and 296) to secure the apparatus (e.g., 100) or box (e.g., 101). In many embodiments, this will keep the box from tipping over or lifting off the floor or ground during the pulling process (e.g., while pulling cable 102 upward through cable holes 521 and 522). In some embodiments, for example, there are two zip ties (e.g., 1104, 1204, or both) provided in each outer box (e.g., 101) that are used to secure the box during the pulling process.

In many embodiments, when the outer box (e.g., 101) is assembled, the back side (e.g., 225) is parallel to the front side (e.g., 115). As used herein, unless stated otherwise, "parallel" means parallel to within 10 degrees (e.g., over any overall dimension of the side). Similarly, in many embodiments, when the outer box (e.g., 101) is assembled, the right side (e.g., 235) is parallel to the left side (e.g., 145). Further, in various embodiments, when the outer box (e.g., 101) is assembled, the top side (e.g., 165) is parallel to the bottom side (e.g., 655). Even further, in many embodiments, sides that are not opposite or are not parallel (or both) are perpendicular (i.e., to each other), for instance, as shown. As used herein, unless stated otherwise, "perpendicular" means perpendicular to within 10 degrees (e.g., 80 to 100 degrees).

In a number of embodiments, the bottom side (e.g., 655) includes a first bottom flap (e.g., 651 shown in FIGS. 6 to 9, 14, and 15) connected to the back side (e.g., 225), a second bottom flap (e.g., 652 shown in FIGS. 6 to 9, 14, and 15) connected to the front side (e.g., 115), or both. Further, in various embodiments, the bottom side (e.g., 655) includes a third bottom flap (e.g., 653 shown in FIGS. 6 to 8, 11, 14, and 15) connected to the left side (e.g., 145), a fourth bottom flap (e.g., 654 shown in FIGS. 6 to 9, 11, 14, and 15) connected to the right side (e.g., 235), or both. In various embodiments, the outer box (e.g., 101) includes a front side (e.g., 115), a back side (e.g., 225), a right side (e.g., 235), a left side (e.g., 145), and a bottom side (e.g., 655), and the bottom side (e.g., 655) includes a first bottom flap (e.g., 651) connected to the back side (e.g., 225), a second bottom flap (e.g., 652) connected to the front side (e.g., 115), a third bottom flap (e.g., 653) connected to the left side (e.g., 145), a fourth bottom flap (e.g., 654) connected to the right side (e.g., 235) or a combination thereof. Further still, in certain embodiments, when the outer box (e.g., 101) is assembled, the third bottom flap (e.g., 653) fits between the first bottom flap (e.g., 651) and the second bottom flap (e.g., 652), the fourth bottom flap (e.g., 654) fits between the first bottom flap (e.g., 651) and the second bottom flap (e.g., 652), or both (e.g., as shown).

In many embodiments, the outer box (e.g., 101) is made of cardboard. Further, in a number of embodiments having, an inner packaging component (e.g., 710), for example, within the outer box (e.g., 101), the inner packaging component (e.g., 710) is made of cardboard. Still further, in certain embodiments, the inner packaging component (e.g., 710) is or includes an inner box (e.g., 1110 shown in FIGS. 4, 7 to 11 and 16 to 18). Moreover, in some embodiments, the inner packaging component (e.g., 710) is or includes a tray (e.g., inner box 1110 being an example). Further still, in particular embodiments, the inner packaging component (e.g., 710) includes multiple cutouts or holes (e.g., 1650 shown in FIG. 16), for example, that hold multiple components (e.g., 404) used for installing the cable (e.g., 102). Even further, in some embodiments, the multiple components (e.g., 404) used for installing the cable (e.g., 102) are accessed by opening the top side (e.g., 165), for instance, of the outer box (e.g., 101). Even further still, in some embodiments, the inner packaging component (e.g., 710) includes a tubular body (e.g., inner box 1110 being an example), an elongated member (e.g., 1199 shown in FIGS. 7 to 9, 11, and 16), for example, that locates the inner box (e.g., 1110) or inner packaging component (e.g., 710) within the outer box (e.g., 101), or both. As used herein, "elongated" means more than twice as long as (e.g., the member is) wide. Moreover, in a number of embodiments, for example, having a reel (e.g., 707) and an inner packaging component (e.g., 710) or inner box (e.g., 1110) within the outer box (e.g., 101), the inner packaging component (e.g., 710) or inner box (e.g., 1110) is held in position within the outer box (e.g., 101) by the reel (e.g., 707), the elongated member (e.g., 1199) of the inner packaging component (e.g., 710), or both. Still further, in some embodiments, the inner box (e.g., 1110) or inner packaging component (e.g., 710) extends within the outer box (e.g., 101) from the front side (e.g., 115) to the back side (e.g., 225), from the left side (e.g., 145) to the right side (e.g., 235), or both. See, for example, FIG. 4. Further still, in certain embodiments, the elongated member (e.g., 1199) of the inner packaging component (e.g., 710) extends within the outer box (e.g., 101) to the bottom side (e.g., 655) of the outer box (e.g., 101), along the right side (e.g., 235) of the outer box (e.g., 101), or both. See, for instance, FIGS. 7, 8, and 11.

Figure 10:
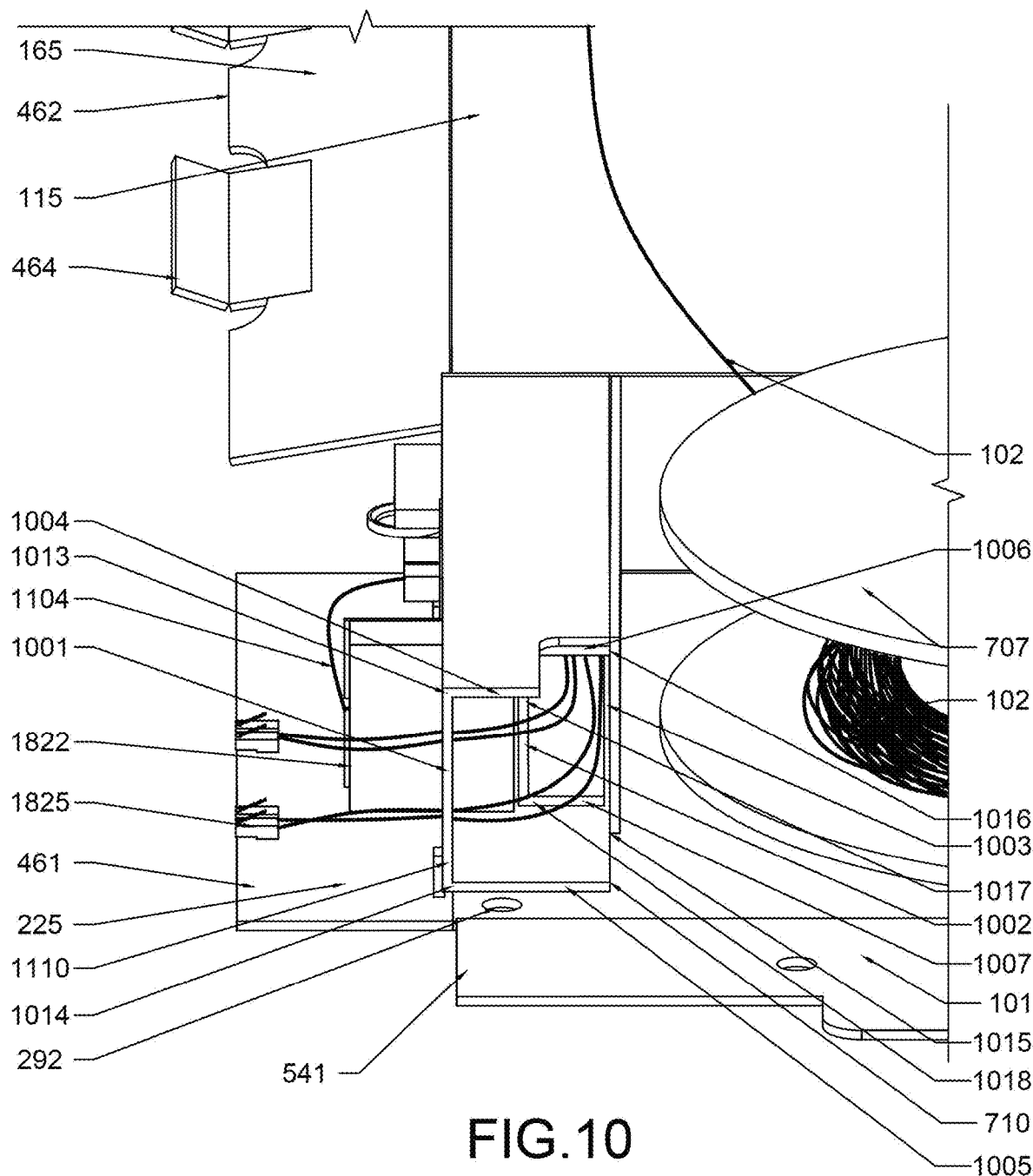
FIG. 10 is an isometric view of part of the apparatus or outer box of FIGS. 1 to 9. This view is at a similar angle as FIG. 9 but is a closeup view of the inner packaging component. In this view, the top layer of the inner packaging component is vertical in the view and is in about the center if the view, the bottom layer is on the right side of the view by the reel, the middle layer is about half way between the top layer and the bottom layer, the front outer layer is horizontal in this view near the top of the view and extends from the top layer to the bottom layer, and the back outer layer is just above the bottom of the view and extends from the top layer to the bottom layer. Also visible are the front inner layer that extends from the middle layer to the bottom layer and the back inner layer (opposite the front inner layer) that would normally extend from the middle layer to the bottom layer. This view also shows that, the inner packaging component has a spiral shape when viewed from the left side of the outer box and that, in this embodiment, the front outer layer is connected to the top layer by a (e.g., third) bend (e.g., a right-angle bend), the back outer layer is connected to the top layer by a (e.g.,) fourth bend, the back outer layer is connected to the bottom layer by a (e.g., fifth) bend, the front inner layer is connected to the bottom layer by a (e.g., sixth) bend, the front inner layer is connected to the middle layer by a (e.g., seventh) bend, and the back inner layer is connected to the middle layer by an (e.g., eighth) bend.
Figure 11:
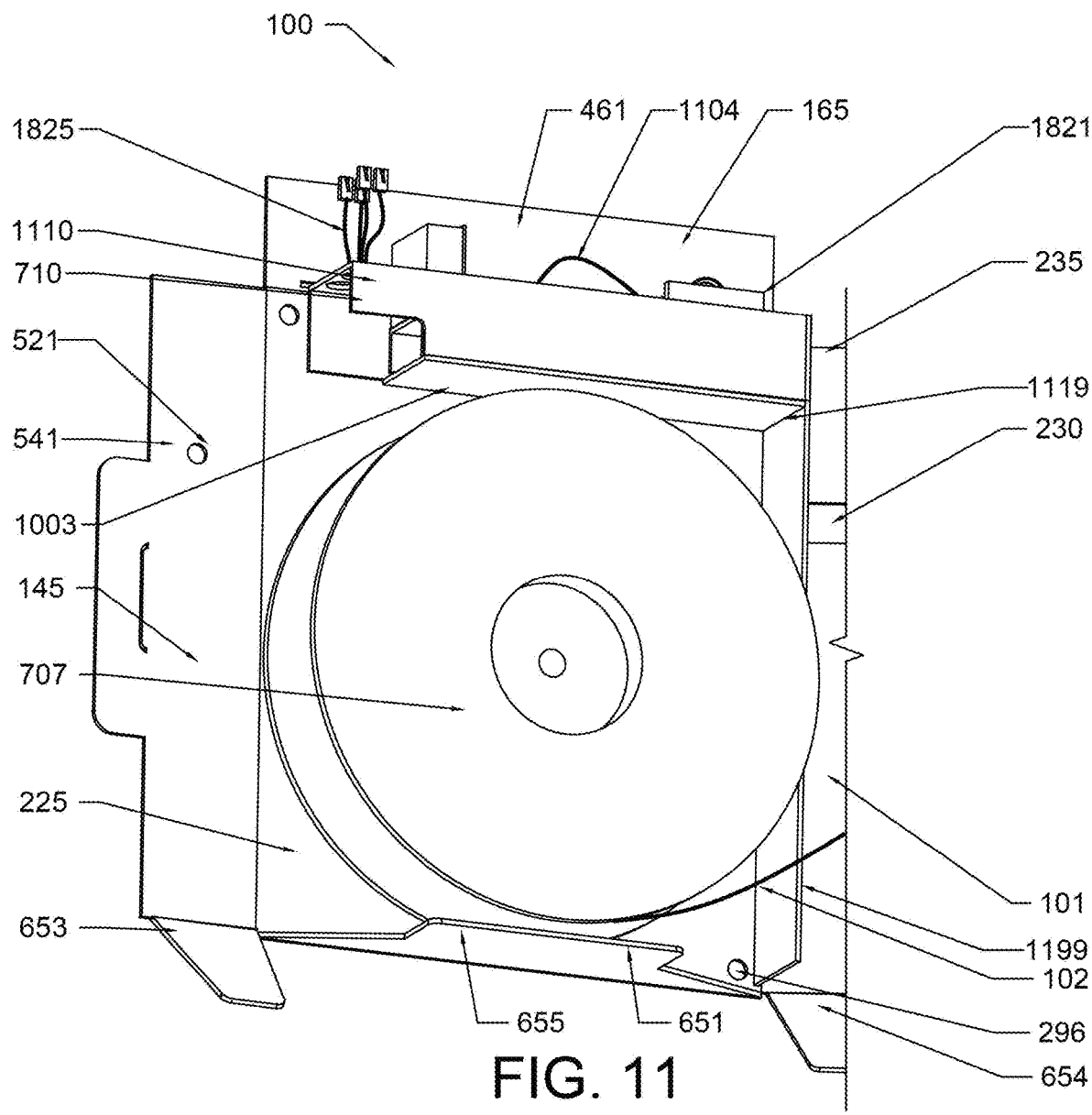
FIG. 11 is another isometric view of part of the apparatus or outer box of FIGS. 1 to 10. In this view, the front side of the outer box is also folded open and is outside of the view on the right side and the part of the bottom side of the outer box that is shown is at the bottom of the view. The reel and inner packaging component, including the elongated member and its connection to the bottom layer by a (e.g., ninth) bend, are shown. Various flaps and tabs are also visible. This view shows how the inner packaging component or inner box is supported or held in place by the reel and elongated member.
Figure 16:
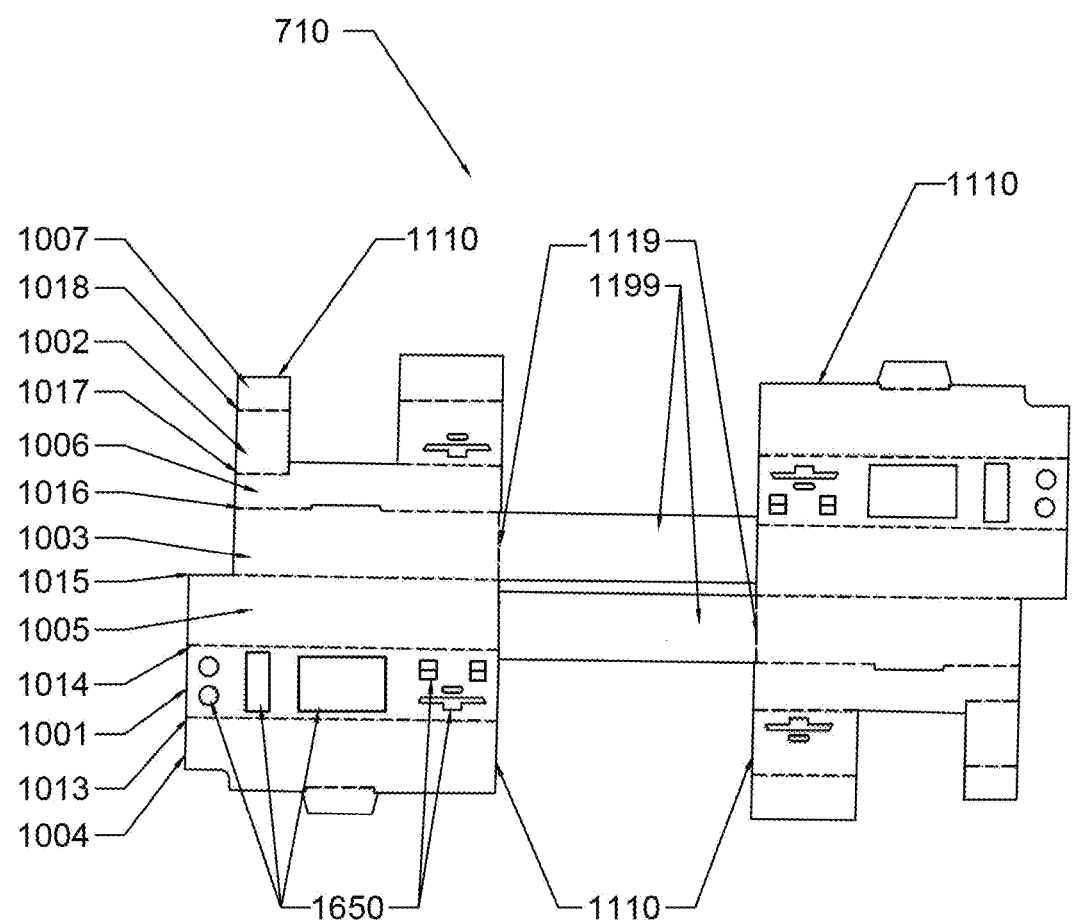
FIG. 16 is a flat pattern of an inner box or inner packaging component, for example, that goes within the outer box, for instance, that holds multiple components used for installing the cable. This flat pattern makes two inner packaging components from one sheet of cardboard. The elongated members are in the center of the view. Holes for holding the multiple components are shown.

Moreover, in some embodiments having an inner box (e.g., 1110) or inner packaging component (e.g., 710) within the outer box (e.g., 101), the inner box (e.g., 1110) or inner packaging component (e.g., 710) has a spiral shape, for example, when viewed from the left side (e.g., 145) of the outer box (e.g., 101), for example, when the left side (e.g., 145) is open. See, for example, FIGS. 9 and 10. As shown in FIG. 10, in particular embodiments, the inner box (e.g., 1110) or inner packaging component (e.g., 710) has a top layer (e.g., 1001, also shown in FIGS. 17 and 18) that faces or is parallel to the top side (e.g., 165, that is, when box 101 is assembled and top side 165 is closed as shown in FIGS. 1, 2, 12, and 13), a bottom layer (e.g., 1003), for example, opposite (i.e., relative to inner box 1110) the top layer (e.g., 1001), a middle layer (e.g., 1002), for example, that is between the top layer (e.g., 1001) and the bottom layer (e.g., 1003) or a combination thereof (e.g., as shown). In some embodiments, the top layer (e.g., 1001), middle layer (e.g., 1002), and bottom layer (e.g., 1003) are all parallel (i.e., to each other), or substantially parallel (i.e., to each other). As used herein, "substantially parallel" means parallel to within 20 degrees. Further, some embodiments include a front outer layer (e.g., 1004 shown in FIGS. 10 and 17), for instance, that extends from the top layer (e.g., 1001) to the bottom layer (e.g., 1003), a back outer layer (e.g., 1005 shown in FIGS. 10 and 18), for example, opposite (i.e., relative to inner box 1110) the front outer layer (e.g., 1004), for instance, that extends from the top layer (e.g., 1001) to the bottom layer (e.g., 1003), or both) or both such outer layers (e.g., as shown in FIGS. 10 and 16). Still further, some embodiments include a front inner layer (e.g., 1006), for example, that extends from the middle layer (e.g., 1002) to the bottom layer (e.g., 1003), a back inner layer (e.g., 1007), for instance, opposite (i.e., relative to inner box 1110) the front inner layer (e.g., 1006), for example, that extends from the middle layer (e.g., 1002) to the bottom layer (e.g., 1003), or both), or both such inner layers (e.g., as shown). In different embodiments, the front outer layer (e.g., 1004) is parallel to the back outer layer (e.g., 1005), the front inner layer (e.g., 1006) is parallel to the back inner layer (e.g., 1007), the front outer layer (e.g., 1004) is parallel to the front inner layer (e.g., 1006), the back outer layer (e.g., 1005) is parallel to the back inner layer (e.g., 1007), or a combination thereof. In other embodiments, such front and back layers are substantially parallel, as another example.

In particular embodiments, for example, that include a front outer layer (e.g., 1004) that extends from the top layer (e.g., 1001), the front outer layer (e.g., 1004) is connected to the top layer (e.g., 1001) by a third bend (e.g., 1013). Further, in some embodiments, for instance, that include a back outer layer (e.g., 1005) that extends from the top layer (e.g., 1001), the back outer layer (e.g., 1005) is connected to the top layer (e.g., 1001) by a fourth bend (e.g., 1014). Still further, in some embodiments that include a back outer layer (e.g., 1005), for example, that extends to the bottom layer (e.g., 1003), the back outer layer (e.g., 1005) is connected to the bottom layer (e.g., 1003) by a fifth bend (e.g., 1015). Further still, in some embodiments that include a front inner layer (e.g., 1006), for instance, that extends to the bottom layer (e.g., 1003), the front inner layer (e.g., 1006) is connected to the bottom layer (e.g., 1003) by a sixth bend (e.g., 1016). Even further, some embodiments that include a front inner layer (e.g., 1006), for example, that extends to the middle layer (e.g., 1002), the front inner layer (e.g., 1006) is connected to the middle layer (e.g., 1002) by a seventh bend (e.g., 1017). Even further still, in some embodiments that include a back inner layer (e.g., 1007), for instance, that extends to the middle layer (e.g., 1002), the back inner layer (e.g., 1007) is connected to the middle layer (e.g., 1002) by an eighth bend (e.g., 1018). Moreover, some such embodiments further include an elongated member (e.g., 1199), for example, that extends from the bottom layer (e.g., 1003). In some embodiments, for instance, the elongated member (e.g., 1199) is connected to the bottom layer (e.g., 1003) by a ninth bend (e.g., 1119 shown in FIGS. 8, 11, and 16). Furthermore, in some embodiments having a bend, the bend is a right-angle bend. As used herein, a right-angle bend is a bend with an angle between 80 and 100 degrees. Examples include bends 272, 771, 1013, 1014, 1015, 1016, 1017, 1018, and 1119. Other bends are shown that may be right-angle bends. Further, in some embodiments having multiple bends, some or all of the bends are right-angle bends. Even further, in some embodiments having a bend, the bend is a substantially right-angle bend. As used herein, a substantially right-angle bend is a bend with an angle between 70 and 110 degrees. Further, in some embodiments having multiple bends (e.g., more than one of bends 272, 771, 1013 to 1018, and 1119), some or all of the bends are substantially right-angle bends.

In various embodiments that include the cable (e.g., 102), the outer box (e.g., 101) includes a right side (e.g., 235) and a left side (e.g., 145), and, when the outer box (e.g., 101) is assembled, the cable (e.g., 102) pulls best from the outer box (e.g., 101) when the left side (e.g., 145) is up, for example, when the cable (e.g., 102) is pulled upward, for instance, into a ceiling. As mentioned, in many embodiments, a reel (e.g., 707) is located inside the outer box (e.g., 101). In some embodiments, the reel (e.g., 707) is loose or fits loosely inside the outer box (e.g., 101), the reel (e.g., 707) is not mounted on a spindle, or a combination thereof. In some embodiments, for example, the reel (e.g., 707) is loose inside the outer box (e.g., 101) which acts as a brake to keep the reel (e.g., 707) from over spinning when the cable (e.g., 102) is pulled, for instance, out of the box (e.g., 101), for example, from the reel (e.g., 707). In this context, as used herein, "loose" means that the outside diameter of the reel rubs (e.g., on the outer box) when the cable is pulled from the reel. In some embodiments, (e.g., unlike a normal category cable box), the outer box (e.g., 101) has a reel (e.g., 707) that fits loose inside the box. In various embodiments, the reel (e.g., 707) acts like a brake because there is no spindle allowing the reel (e.g., 707) to spin freely.

In many embodiments, the outer box (e.g., 101) has a tray (e.g., inner box 1110) or inner packaging component (e.g., 710) inside the outer box (e.g., 101), for example, for some or all components that are needed or useful to complete a data drop. In some embodiments, for instance, the apparatus (e.g., 100) includes at least one zip tie (e.g., 1104 or 1204), for example, within the outer box (e.g., 101), for instance, for securing the outer box (e.g., 101) while pulling the cable (e.g., 102). Still further, in particular embodiments, the apparatus (e.g., 100) includes two zip ties (e.g., 1104, 1204, or both) within the outer box (e.g., 101) for securing the outer box (e.g., 101) while pulling the cable (e.g., 102). Further still, in certain embodiments, the apparatus (e.g., 100) further includes at least one zip tie (e.g., 1104 or 1204) specifically within the inner packaging component (e.g., 710) for securing the outer box (e.g., 101) while pulling the cable (e.g., 102). Even further still, in some embodiments, the apparatus (e.g., 100) includes multiple components (e.g., 404) used for installing the cable (e.g., 102), and the multiple components (e.g., 404) used for installing the cable (e.g., 102) include at least one zip tie (e.g., 1104 or 1204), for example, for securing the outer box (e.g., 101) while pulling the cable (e.g., 102).

In some embodiments, the apparatus (e.g., 100), or the multiple components (e.g., 404) used for installing the cable (e.g., 102), include(s) a gang bracket (e.g., 1820 shown in FIGS. 17 and 18), for example, within the inner packaging component (e.g., 710), for securing a faceplate (e.g., 1821) to a wall (e.g., that includes drywall, Sheetrock, or gypsum board), for instance, to terminate the cable (e.g., 102) at the wall. See also FIGS. 4, 7, and 11. In particular embodiments, for example, the gang bracket (e.g., 1820) is a single gang bracket, for instance, that is provided to terminate the cable (e.g., 102) into the gypsum board. In a number of embodiments, the (e.g., single) gang bracket (e.g., 1820) will secure to the gypsum board once a hole is cut. In many embodiments, the bracket will allow the installer to secure a single gang faceplate (e.g., 1821) to the wall.

Still further, in some embodiments, the apparatus (e.g., 100) includes a faceplate (e.g., 1821), for example, within the inner packaging component (e.g., 710), for instance, for terminating the cable (e.g., 102) at a wall (e.g., that includes drywall or gypsum board). In some embodiments, the multiple components (e.g., 404) used for installing the cable (e.g., 102) include the faceplate (e.g., 1821) for terminating the cable (e.g., 102) at a wall. In some embodiments, for example, the faceplate (e.g., 1821) is a single gang faceplate, for instance, provided for a gypsum board wall installation. In particular embodiments, for example, the faceplate (e.g., 1821) has two ports, one faceplate (e.g., 1821) blank, mounting screws to secure the faceplate (e.g., 1821) to a (e.g., single) gang bracket (e.g., 1820), or a combination thereof, as examples.

Even further, in some embodiments, the apparatus (e.g., 100) includes a surface mount box (e.g., 1822 shown in FIGS. 4, 9, 10, 17, and 18), for instance, within the inner packaging component (e.g., 710). See also FIGS. 7, 8, and 11. Even further still, in certain embodiments, the multiple components (e.g., 404) used for installing the cable (e.g., 102) include the surface mount box (e.g., 1822). Particular embodiments further include mounting screws, double sided tape, or both, for instance, for installing the surface mount box (e.g., 1822). In particular embodiments, for example, one two-port surface mount box (e.g., 1822) is included in the apparatus (e.g., 100), for instance, with mounting screws and double sided tape for multitude installation options.

Figure 17:
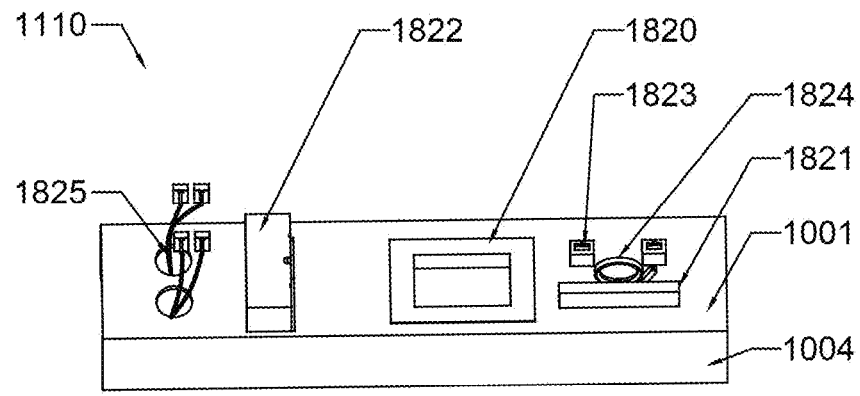
FIG. 17 is an isometric view of an inner box or inner packaging component, for example, that goes within the outer box, for instance, that holds multiple components used for installing the cable. Various examples of the multiple components are shown. The elongated member is not shown in this view.
Figure 18:
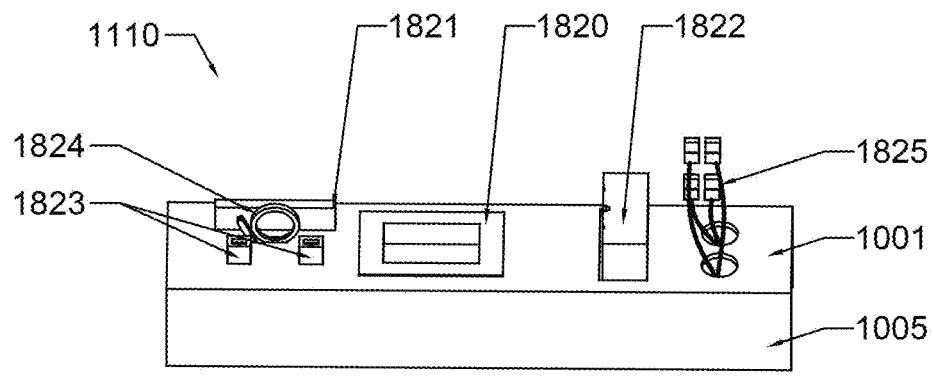
FIG. 18 is another isometric view of an inner box or inner packaging component, for example, that goes within the outer box, for instance, that holds multiple components used for installing the cable. Examples of the multiple components are shown. The elongated member is also not shown in this view.

Further, in some embodiments, the apparatus (e.g., 100) includes at least one (e.g., RJ45) jack (e.g., 1823 shown in FIGS. 17 and 18), for example, within the inner packaging component (e.g., 710). See also FIG. 4. In particular embodiments, for example, the multiple components (e.g., 404) used for installing the cable (e.g., 102) include at least one RJ45 jack (e.g., 1823). In some embodiments, for instance, two (e.g., RJ45) jacks (e.g., 1823) are provided (e.g., as shown in FIGS. 17 and 18), for example, one jack for each end of the cable (e.g., 102). Still further, in some embodiments, the apparatus (e.g., 100) or the multiple components (e.g., 404) include a termination tool (e.g., 1824 shown in FIGS. 17 and 18), for example, used to strip the jacket off of the cable (e.g., 102), punch down the cable onto a jack (e.g., 1823), or both. Further still, in some embodiments, the apparatus (e.g., 100) includes at least one patch cord (e.g., 1825 shown in FIGS. 2, 7, 9, 10, 11, 17, and 18). See also FIGS. 4, 5, and 8. In certain embodiments, for example, the multiple components (e.g., 404) used for installing the cable (e.g., 102) include at least one patch cord (e.g., 1825). Even further, in particular embodiments, the apparatus (e.g., 100) includes two patch cords (e.g., 1825), for instance, as shown. In certain embodiments, at least one patch cord (e.g., 1825) is used to complete a connection between an incoming data signal and a device that the cable (e.g., 102) is bringing the connection to, for example.

In various embodiments, the front side (e.g., 115) has a front total surface area, the back side (e.g., 225) has a back total surface area, and the front total surface area is equal to the back total surface area (e.g., as shown). As used herein, surface areas are considered to be equal if they are within ten percent. Further, in various embodiments, the left side (e.g., 145) has a left total surface area, the right side (e.g., 235) has a right total surface area, and the left total surface area is equal to the right total surface area (e.g., as shown). Still further, in some embodiments, the front total surface area is greater than the right total surface area (e.g., as shown). Further still, in certain embodiments, the front total surface area is at least twice the right total surface area, the front total surface area is at least three times the right total surface area, the front total surface area is no more than five times the right total surface area, or a combination thereof. Even further, in particular embodiments, the front total surface area is about four times the right total surface area (e.g., as shown). As used herein, "about" means to within twenty percent. Even further still, in certain embodiments, the front total surface area is four times the right total surface area (i.e., the front total surface area is within ten percent of four times the right total surface area).

Moreover, in some embodiments, the top side (e.g., 165) has a top total surface area, the bottom side (e.g., 655) has a bottom total surface area, and the top total surface area is equal to the bottom total surface area within ten percent) (e.g., as shown). Furthermore, in various embodiments, the front total surface area is greater than the top total surface area, the front total surface area is at least twice the top total surface area, the front total surface area is at least four times the top total surface area, the front total surface area is no more than six times the top total surface area, the front total surface area is no more than five times the top total surface area, or a combination thereof. Further, in particular embodiments, the front total surface area is about five times the top total surface area (e.g., as shown). Even further, in various embodiments, the right total surface area is greater than the top total surface area, the right total surface area is no more than twice the top total surface area, the right total surface area is no more than 1.5 times the top total surface area, the right total surface area is between 1.1 and 1.25 times the top total surface area, the right total surface area is between 1.16 and 1.18 times the top total surface area, or a combination thereof, as examples. An example is shown.

Figure 2:
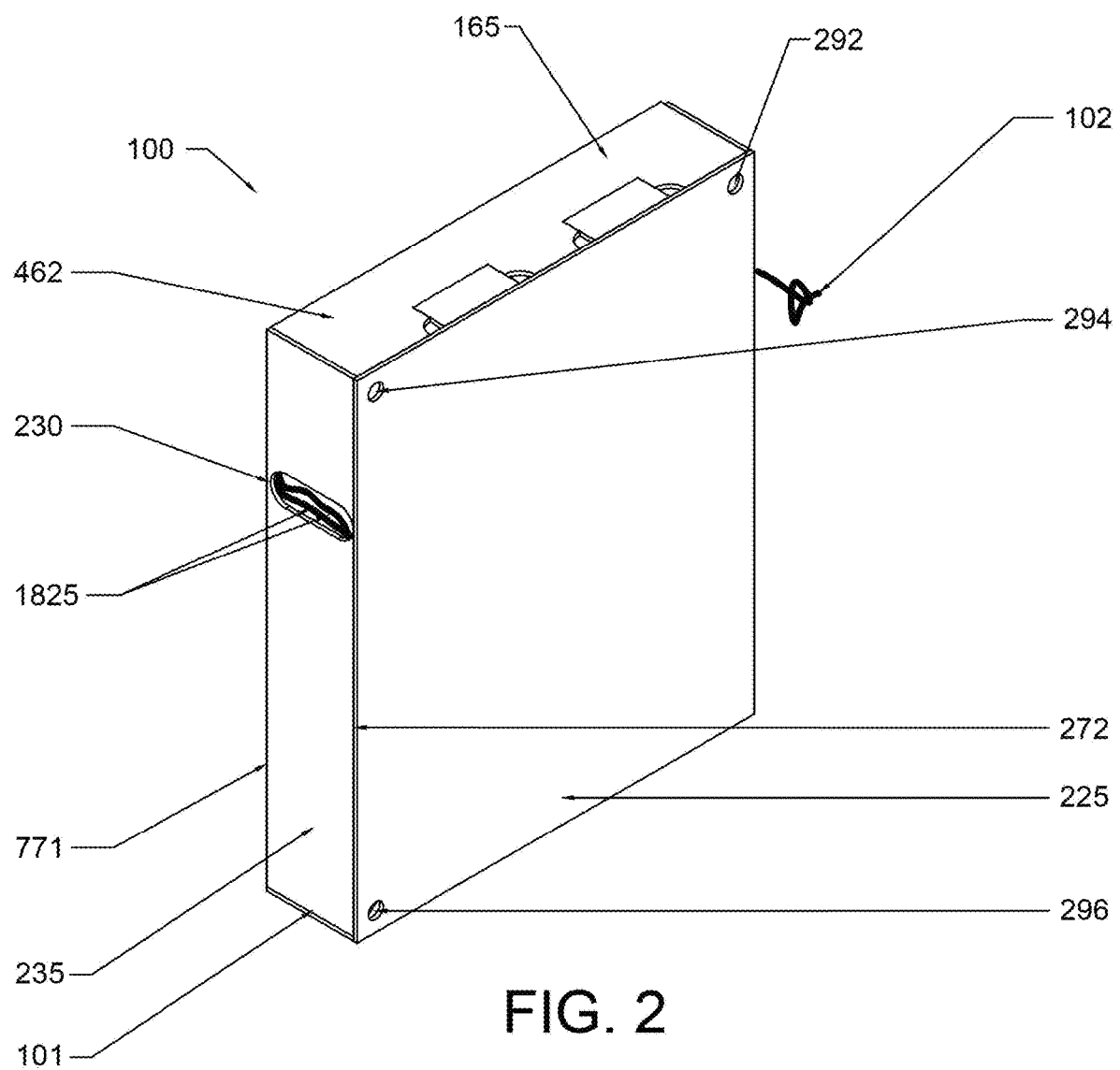
FIG. 2 is another isometric view of the apparatus or outer box of FIG. 1. In this view, the top side of the box is up, the right side of the box faces to the left, and the back side of the box faces to the right. The right opening and tie holes are visible.
Figure 3:
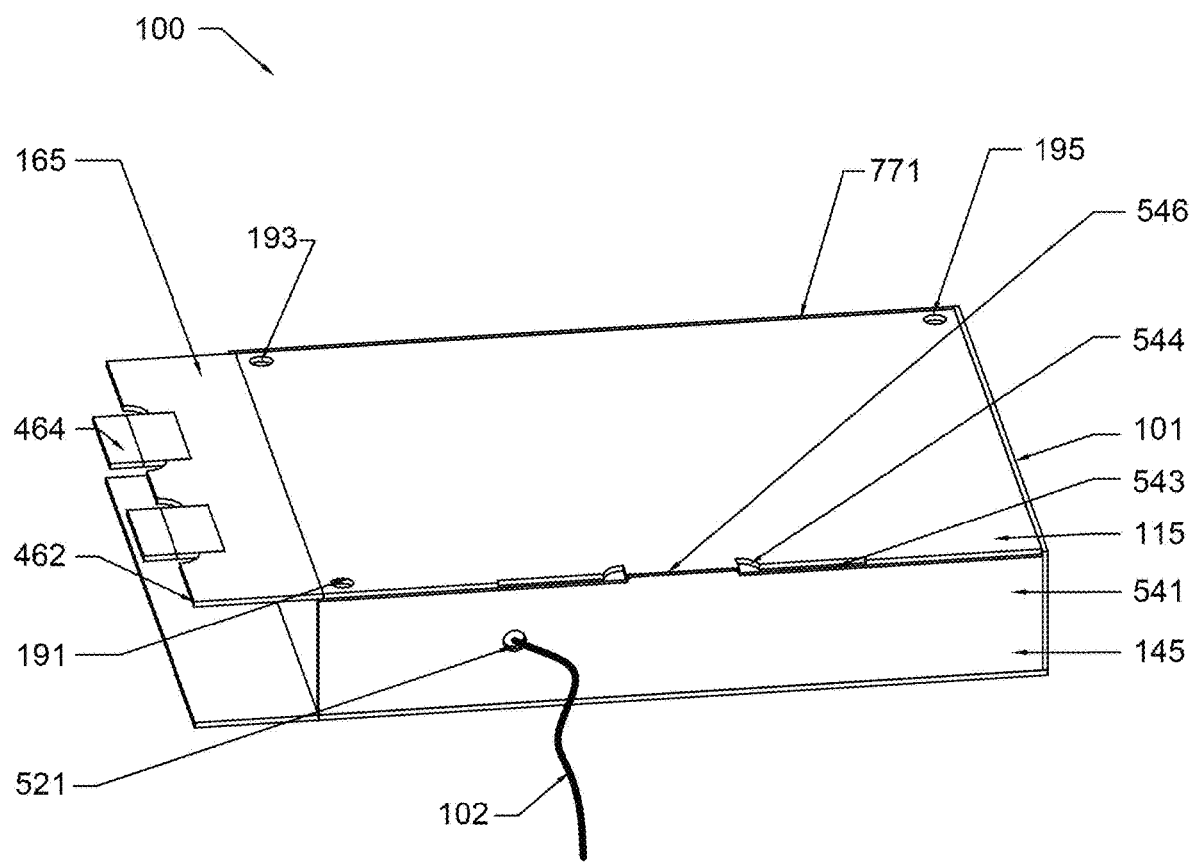
FIG. 3 is another isometric view of the apparatus or outer box of FIGS. 1 and 2. In this view, the front side of the box is up, the left side of the box faces the viewer, and the top side of the box faces to the left. The top side of the outer box is open and the cable extends from the cable hole in the left side.
Figure 4:
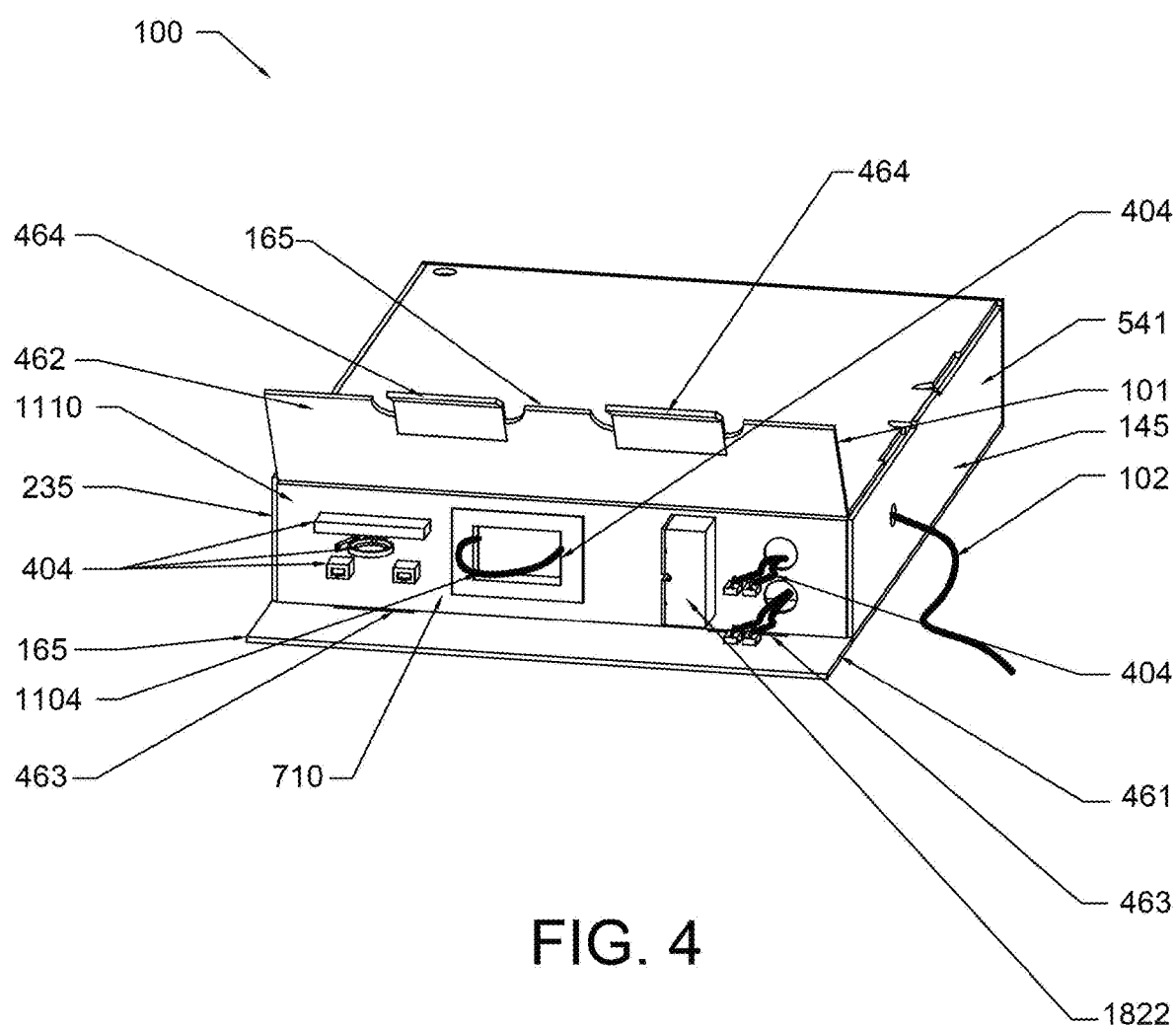
FIG. 4 is another isometric view of the apparatus or outer box of FIGS. 1 to 3. In this view, the top side of the outer box is open and faces the viewer revealing the inner packaging component within the outer box and the multiple components used for installing the (e.g., communications) cable. The left side of the box faces to the right and the cable extends from the cable hole in the left side.
Figure 5:
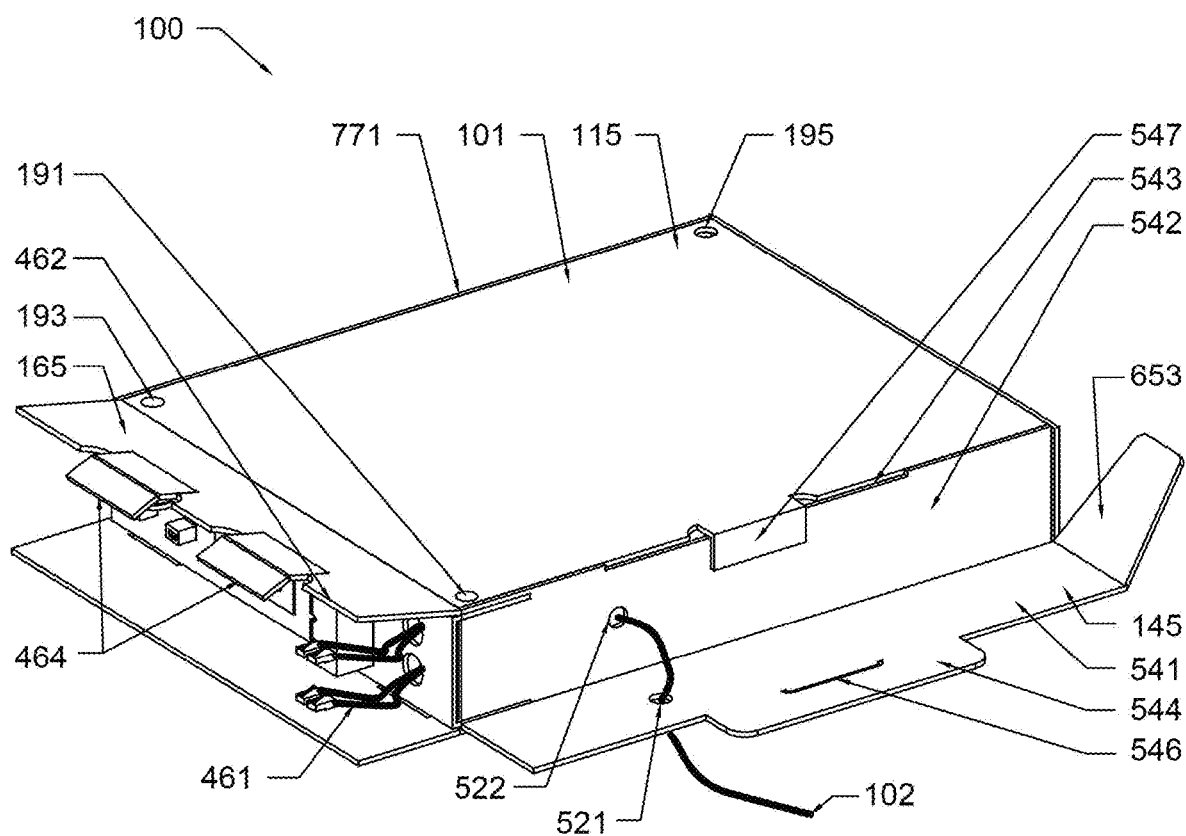
FIG. 5 is another isometric view of the apparatus or outer box of FIGS. 1 to 4. In this view, the front side of the outer box is up, the top side of the outer box is open and faces left, and the left side of the outer box faces the viewer and is partially open revealing two cable holes in the first side flap and second side flap.
Figure 6:
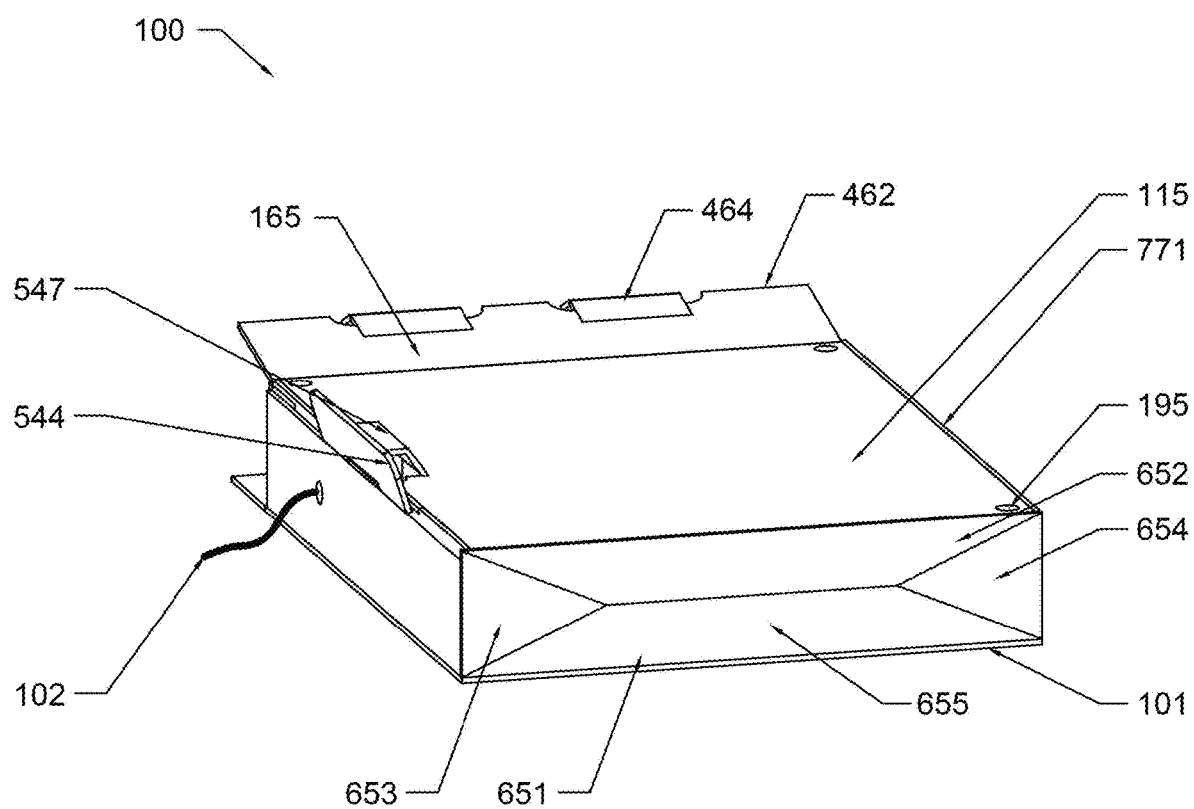
FIG. 6 is another isometric view of the apparatus or outer box of FIGS. 1 to 5. In this view, the front side of the outer box is up and the bottom side of the outer box faces the viewer and slightly right. The left side of the outer box faces left and is partially open revealing the first side tab and the second side tab. A tie hole is visible in the lower right corner of the front side. The assembled four bottom flaps of the bottom side are visible in this view.
Figure 7:
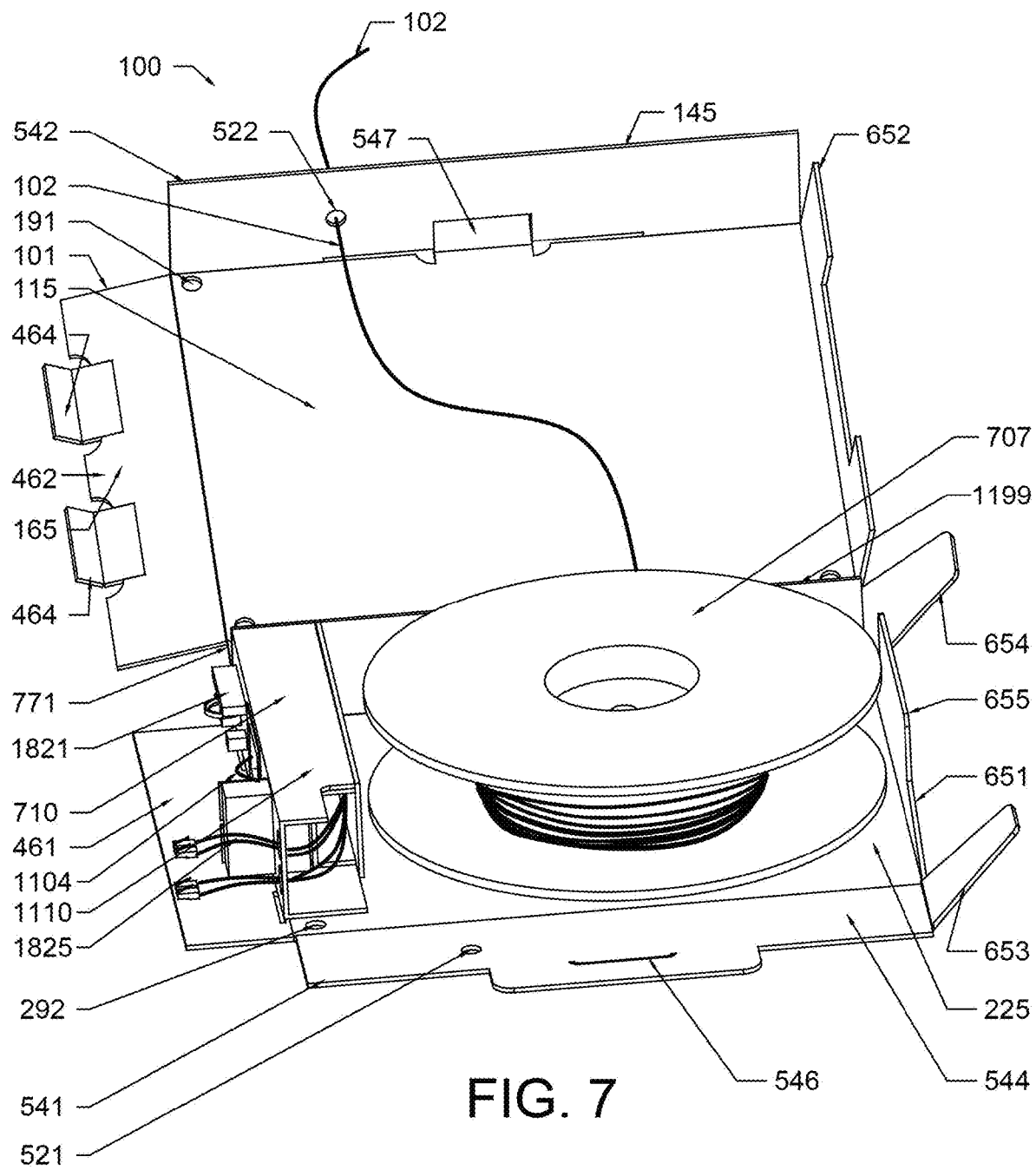
FIG. 7 is another isometric view of the apparatus or outer box of FIGS. 1 to 6. In this view, the front side of the outer box has been folded open and is at the top of the view and the bottom side of the outer box is on the right side of the view. The reel (e.g., inside the outer box), the (e.g., communications) cable, which is wound around the reel, the inner packaging component (including the elongated member), and at least some of the multiple components used for installing the cable, are visible. This view shows an example of how the inner packaging component holds the multiple components used for installing the communications cable. Various flaps and tabs of this particular embodiment are visible.
Figure 8:
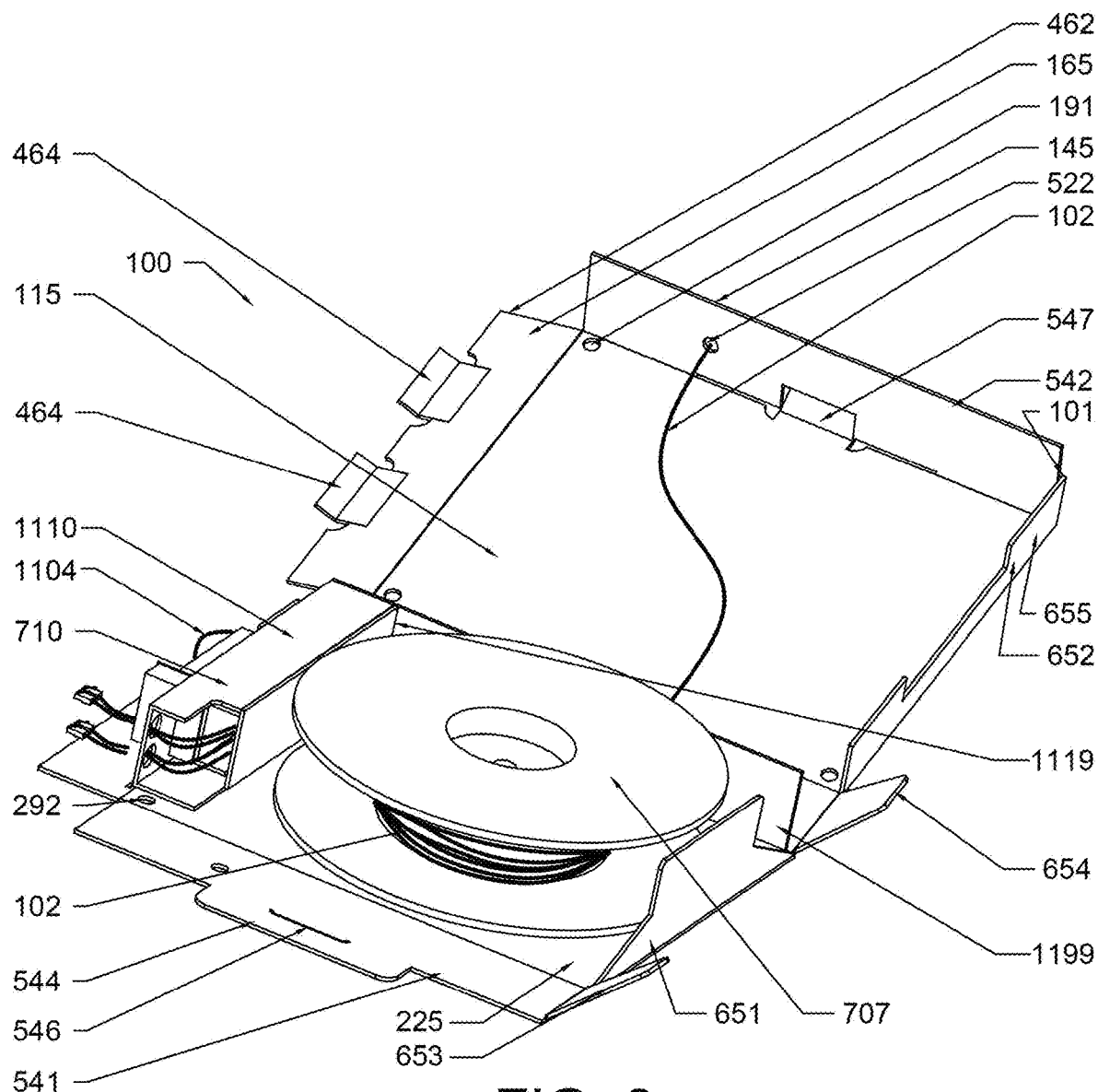
FIG. 8 is another isometric view of the apparatus or outer box of FIGS. 1 to 7. In this view, the front side of the outer box is also folded open and is on the top right side of the view and the bottom side of the outer box faces down and to the right. The reel, cable, and inner packaging component (including the elongated member) are shown. Various flaps and tabs are visible.
Figure 9:
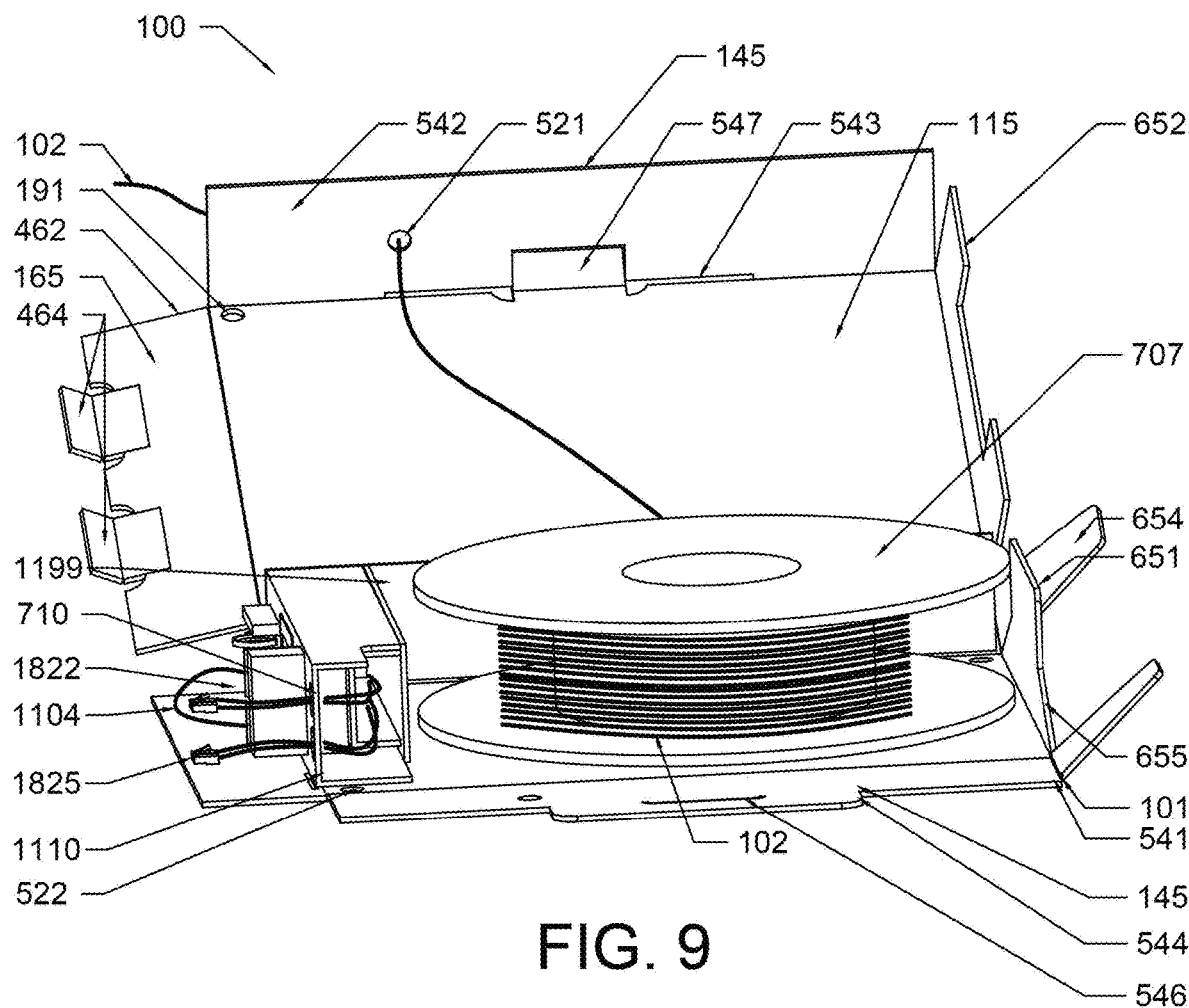
FIG. 9 is another isometric view of the apparatus or outer box of FIGS. 1 to 8. In this view, the front side of the outer box is also folded open and is at the top of the view and the bottom side of the outer box faces to the right. The reel, cable, and inner packaging component are shown. Various flaps and tabs are visible.

In particular embodiments, the outer box (e.g., 101) has a right side (e.g., 235) that includes a right opening (e.g., 230 shown in FIGS. 2 and 15). Further, in some embodiments, the right opening (e.g., 230) is open to at least one of the multiple components (e.g., 404) used for installing the communications cable (e.g., 102). Further still, in particular embodiments, the right opening (e.g., 230) is open to at least one patch cord (e.g., 1825) or to two patch cords (e.g., 1825, as shown in FIG. 2), as examples, for instance, used to complete a connection between an incoming data signal and a device that the cable (e.g., 102) is bringing the connection, to. Still further, in particular embodiments, the right opening (e.g., 230) is elongated, has two opposite straight edges, has two opposite semi-circular ends, or a combination thereof (e.g., as shown), as examples.

Further, various embodiments of the subject matter described herein include various combinations of the acts, structure, components, and features described herein, shown in the drawings, described in documents that are submitted herewith or incorporated by reference herein, or that are known in the art. Moreover, certain procedures can include acts such as manufacturing, obtaining, or providing components that perform functions described herein or in the documents that are incorporated by reference. The subject matter described herein also includes various means for accomplishing the various functions or acts described herein, in the documents that are submitted herewith or incorporated by reference, or that are apparent from the structure and acts described. Each function described herein is also contemplated as a means for accomplishing that function, or where appropriate, as a step for accomplishing that function. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. An apparatus for installing a cable, the apparatus comprising:
    an outer box;
    a reel located inside the outer box;
    the cable, which is wound around the reel;
    multiple components used for installing the cable, wherein the multiple components for installing the cable are located within the outer box; and
    an inner packaging component within the outer box, wherein the inner packaging component holds the multiple components used for installing the cable;
    wherein, when the outer box is assembled, the outer box comprises:
        a front side;
        a back side opposite the front side;
        a right side extending from the front side to the back side;
        a left side opposite the right side and extending from the front side to the back side;
        a bottom side extending from the front side to the back side and extending from the right side to the left side; and a top side opposite the bottom side, extending from the front side to the back side, and extending from the right side to the left side; and wherein:

the multiple components used for installing the cable are accessed by opening the top side of the outer box;

the inner packaging component extends within the outer box from the front side to the back side;

the inner packaging component extends within the outer box from the left side to the right side; and the inner packaging component is held in position within the outer box by the reel and by an elongated member of the inner packaging component that extends within the outer box to the bottom side.

2. The apparatus of claim 1 wherein the outer box comprises a first cable hole for passage of the cable from the apparatus.

3. The apparatus of claim 1 wherein the reel is loose inside the outer box which acts as a brake to keep the reel from over spinning when the cable is pulled from the reel.

4. The apparatus of claim 1 wherein the outer box comprises a first tie hole and a second tie hole that are sized and configured for passage of a zip tie for attachment of the outer box to an identical outer box or anchoring object.

5. The apparatus of claim 4 wherein the first tie hole is in line with the second tie hole when the outer box is assembled.

6. The apparatus of claim 1 wherein the cable is a communications cable.

7. The apparatus of claim 1 wherein the outer box further comprises a first cable hole in the left side for passage of the cable from the apparatus.

8. The apparatus of claim 1 wherein the outer box further comprises: a first bend between the front side and the right side; and a second bend between the back side and the right side.

9. The apparatus of claim 1 wherein the left side comprises: a first side flap connected to the back side; and a second side flap connected to the front side.

10. The apparatus of claim 9 wherein the left side further comprises: a first side slot; and a first side tab that fits into the first side slot when the outer box is assembled.

11. The apparatus of claim 9 wherein the left side comprises: a first cable hole through the first side flap; and a second cable hole through the second side flap.

12. The apparatus of claim 11 wherein, when the outer box is assembled, the first cable hole lines up with the second cable hole for passage of the cable from the apparatus.

13. The apparatus of claim 1 wherein the outer box further comprises: a first tie hole in the front side; and a second tie hole in the back side; wherein the first tie hole and the second tie hole are sized and configured for passage of a zip tie for attachment of the outer box to an identical outer box or anchoring object.

* * * * *